United States Patent
Ashizaki et al.

(10) Patent No.: US 7,209,585 B2
(45) Date of Patent: Apr. 24, 2007

(54) PICTURE IMAGE GENERATION AND PRINTED MATERIAL PRODUCTION APPARATUS, AND A METHOD THEREOF

(75) Inventors: Koji Ashizaki, Tokyo (JP); Akira Shirakura, Tokyo (JP); Shigeyuki Baba, Tokyo (JP)

(73) Assignee: Sony Corporation (JP)

( * ) Notice: Subject to any disclaimer, the term of this patent is extended or adjusted under 35 U.S.C. 154(b) by 967 days.

(21) Appl. No.: 10/167,475

(22) Filed: Jun. 13, 2002

(65) Prior Publication Data

US 2003/0007204 A1  Jan. 9, 2003

(30) Foreign Application Priority Data

Jun. 14, 2001 (JP) ............... P2001-180615
Jun. 25, 2001 (JP) ............... P2001-191772

(51) Int. Cl.
  *G06K 9/00* (2006.01)
(52) U.S. Cl. ..................................... 382/154
(58) Field of Classification Search .............. 359/9, 359/14, 22, 23, 24, 25, 26; 382/154, 276
See application file for complete search history.

(56) References Cited

U.S. PATENT DOCUMENTS

| | | | | |
|---|---|---|---|---|
| 5,703,961 A | * | 12/1997 | Rogina et al. | 382/154 |
| 6,683,699 B1 | * | 1/2004 | Ashizaki et al. | 358/1.18 |
| 6,859,293 B2 | * | 2/2005 | Klug et al. | 359/4 |
| 6,900,904 B1 | * | 5/2005 | Holzbach et al. | 358/1.15 |
| 7,042,605 B2 | * | 5/2006 | Brotherton-Ratcliffe et al. | 359/22 |
| 7,043,073 B1 | * | 5/2006 | Holzbach | 382/154 |

FOREIGN PATENT DOCUMENTS

JP  3014733  6/1995

OTHER PUBLICATIONS

Instant Holographic Portrait Printing System, Akira Shirakura et al, SPIE vol. 3293, p. 248-255.
Instant Holographic Stereogram Printing Technology, Akira Shirakura et a l, p. 7-15.
Holographic 3-D Printer With Lippmann Holographic Stereogram, Yamaguchi et al, Imaging Science and Engineering Lab, pp. 323-326.
Recording of High Resolution Image by Holographic 3-D Printer, Endoh et al, Imaging Science and Engineering Lab, pp. 317-320.

* cited by examiner

*Primary Examiner*—Jose L. Couso
(74) *Attorney, Agent, or Firm*—Ronald P. Kananen; Rader Fishman & Grauer PLLC

(57) ABSTRACT

A printed material production apparatus comprises: a picture image input section for inputting a picture image string; a picture image conversion section for converting an inputted picture image string inputted into a panoramic picture image; a picture image processing section for generating a viewing point converted picture image string including a plurality of viewing point converted picture images in accordance with the panoramic picture image generated; and a printing section for producing printed material in accordance with the viewing point converted picture image string generated.

38 Claims, 15 Drawing Sheets

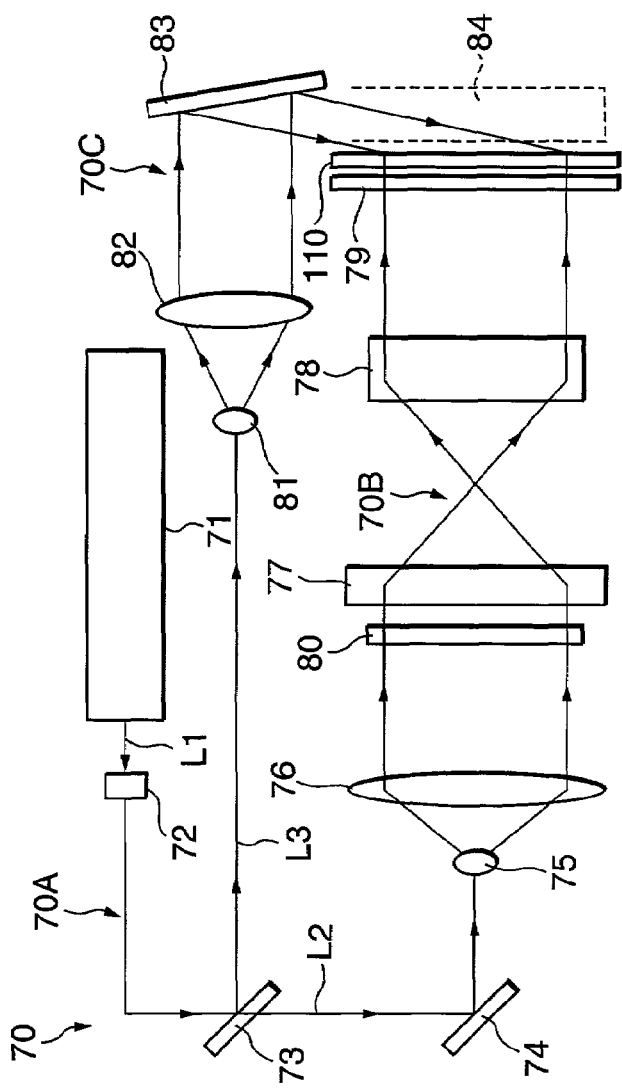
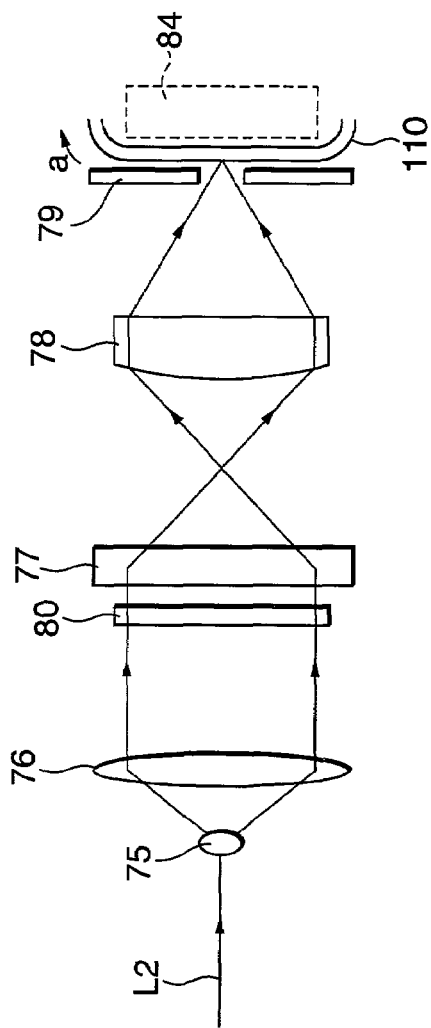
FIG.6A
FIG.6B

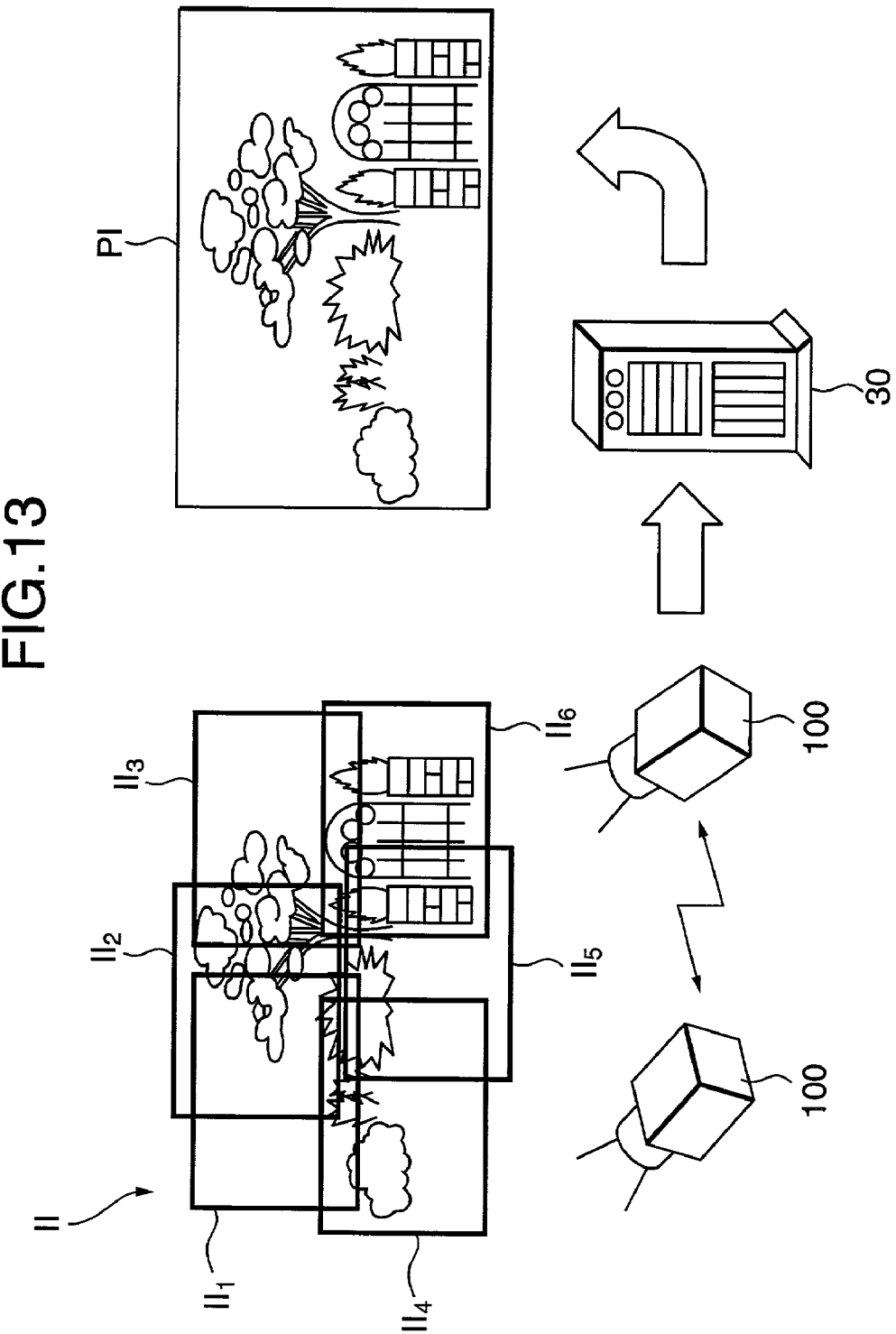

PICTURE IMAGE GENERATION AND PRINTED MATERIAL PRODUCTION APPARATUS, AND A METHOD THEREOF

RELATED APPLICATION INFORMATION

The present document is based on Japanese Priority Documents JP 2001-180615 and 2001-191772 filed in the Japanese Patent Office on Jun. 14 and Jun. 25, 2001, the entire contents of which being incorporated herein by reference.

BACKGROUND OF THE INVENTION

1. Field of the Invention

The present invention relates to a picture image generation apparatus for generating parallax picture images and a method thereof, and a printed material production apparatus for producing printed material in accordance with the parallax picture images thus generated and a method thereof.

2. Related Art

Recently, such an image print providing system as disclosed in Japan Utility Patent No. 3014733 that can provide services from photographing to printing of the photographed image in the same spot is widely known.

Further, recently, a new system that can image and print not only a still picture image but also a motion picture and/or parallax images has been developed, thereby enabling to obtain printed material the image of which changes when the printed material is viewed from a different direction.

For example, there is such a service to provide a parallax picture image photograph as printed material using the lenticular technology, which includes, "Torikkiri Konica 3D (Trade Name)" available with a three-eyes-lens equipped film and its print service from Konica Corp.;

"Kodak Snap Kids 3D (Trade Name)" available with a three-eyes-lens equipped film and its print service from Kodak Corp.;

"MIP (Motion Image Print) card (Trade Name)" synthesized with 6 images, and "UgoiTaro (Trade Name)" apparatus for producing the card, both developed by Matsushita Denki Sangyo K.K.;

"Chikyuya K.K.'s Internet Service" for accepting orders for the card produced by the above-mentioned "UgoiTaro (Trade Name)" on the internet;

"Motion Picture Card Auto Vendor" as business entertainment equipment from Matsushita Denki Sangyo K.K., available as a card comprising a plurality of continuous photographs of an object, and in which the object appears as if moving when viewed from a different angle.

Further, as a similar system, there is such one that produces printed material utilizing the holographic technology capable of rendering parallax images only in the horizontal direction, which includes, for example, "Instant holographic portrait printing system" authored by Akira Shirakura, Nobuhiro Kihara and Shigeyuki Baba, and published in the Proceeding of SPIE, Vol. 3293, pp. 246–253, January 1998;

"Fast holographic portrait printing system" authored by N. Kihara, A. Shirakura, and S. Baba, and published in the 3-D Imaging Conference 1998, July 1998.

In addition to the above, there is another system for producing printed material capable of rendering parallax images in both of the horizontal and vertical directions, which includes, for example, "Holographic 3-D printer using the Lipman holographic stereogram" proposed by Yamaguchi, Honda and Ohyama, at the $20^{th}$ Imaging Engineering Conference, December 1989;

"High density recording with the holographic 3-D printer" proposed by Endo, Yamaguchi, Honda and Ohyama at the $23^{rd}$ Imaging Engineering Conference, December 1992.

Such systems for producing the printed material using the parallax images described above are capable of producing printed material by displaying a plurality of still picture images as if a motion picture film, imaging a plurality of images of an object from different viewing points using a dedicated imaging apparatus, or producing a plurality of images as viewed from different viewing points using the computer graphics (CG).

Further, digital image handling equipment such as a digital still camera, digital video camera recorder and the like are also popular. With widespread of these equipments, a so-called panoramic image generation is enabled using a computer or the like that capable of processing picture images by inputting sequential images or panning images as picture image data and joining there between.

As software for generating the above-mentioned panoramic image, there are available, for example, "PictureGear Version 4.0 (Trade Name)" and "PictureGear Version 5.0 (Trade Name)", available from Sony Corp.;

"Reality Studio (Trade Name)" developed by "Live Picture Inc., USA" and available from "Live Picture Japan";

"QuickTime VR Authoring Studio (Trade Name)" developed by "Apple Computer Inc., USA" and available from "Apple Computer K.K. Japan"; and "Panorama Boutique Light (Trade Name)", "Panorama Boutique Pro (Trade Name)" and "Tailing Boutique (Trade Name)" available from "Sanyo Denki K.K.".

SUMMARY OF THE INVENTION

A person can view a panoramic picture image by producing two-dimensional printed material or photograph using various types of printers such as a sublimation type printer, ink jet printer and the like.

However, these two-dimensional printed material or photograph need to have a size as large as to be able to display the panoramic image as shown in FIG. 16. That is, the two-dimensional printed material or photograph P has to have such a size proportional to the size of panoramic picture image PI, and preferably, a physical size at least greater than the size of the panoramic picture image PI. Such a relationship holds likewise not only when viewing printed material or a photograph physically produced as a panoramic picture image but also when observing a panoramic picture image displayed on a display apparatus such as a CRT, a liquid crystal display or the like. Accordingly, a size of a display screen in the display apparatus causes the size of a panoramic image of an object displayed to depend thereon. That is, the viewer must have a display apparatus having a size capable of displaying a picture image comprising, for example, several hundreds×several hundreds pixels or several thousands×several thousands pixels in order to be able to view a panoramic image comprising several hundreds×several hundreds or several thousands× several thousands pixels as one picture image displayed on the display apparatus.

Further, the viewer of a panoramic picture image can view the panoramic picture image also by use of viewer software specific thereto. Namely, as shown in FIG. 17, the viewer OB can view the panoramic image PI, using a computer COM operable on the viewer software specific thereto, and moving a window W displayed on a display apparatus M by using an input apparatus such as a mouse, keyboard or the like to cut out part by part of the panoramic picture image PI to be displayed on the display apparatus M.

As such viewer software described above, there are, for example,

"LivePicture Plug-in Viewer (Trade Name)" developed by "Live Picture Inc., USA" and sold free of charge from "Live Picture Japan K.K.";

"QuickTime 4.1.2 (Trade Name)" and "QuickTime Pro (Trade Name)" developed by Apple Computer Inc., USA and sold free of charge from Apple Computer Japan K.K.

However, in order to view the panoramic picture image using the aforementioned viewer software, the viewer needs to have the input apparatus such as a mouse, keyboard or the like, a display apparatus and a system capable of operating such viewer software. Accordingly, there is a problem that there incurred a great expense on the side of the viewer to purchase these hardware and software.

The present invention is conceived to alleviate or solve problems associated with the related art described above. It is desirable to provide a printed material production apparatus and a method thereof capable of producing printed material which although being printed material enables a large sized still picture image such as a panoramic image to be observed through its surface which is smaller than a normally required physical size for displaying the panoramic picture image by means of the two-dimensional printed material or photograph of the related art described above.

When obtaining a string of parallax picture images by imaging an object as in the above-mentioned printed material production apparatus, there exist various parameters to be considered such as an imaging picture angle by an imaging apparatus, an imaging distance indicating a positional relationship between an imaging point and the object to be imaged, a translational distance of the imaging apparatus, an imaging pitch and so on. Further, also in its printing apparatus for generating a holographic stereogram to be output as the printed material, various parameters are required to be considered for specifying, for example, at what viewing angle and at what exposure pitch its exposure and recording should be executed.

Here, if printed material, for example, of a holographic stereogram is to be produced using a parallax picture image string obtained by imaging with the imaging apparatus, it is necessary to match various parameters used in the imaging apparatus and those to be used in the printing apparatus. If failed in their matching, a correct stereogram picture image cannot be obtained.

Further, the parallax picture image string may be generated as computer generated picture images by utilizing computer graphics (CG) technology. When the printed material of a holographic stereogram or the like is to be produced using the parallax picture image string generated by CG, it is also necessary to match various parameters used in the picture image generation by CG and other various parameters to be used in the printing apparatus in order to ensure the printing of a correct stereographic picture image.

These conditions to be considered as described above also applies to such an instance when recording a background picture image in the printed material made in form of a holographic stereogram or the like. As such a background picture image, there is considered a two-dimensional panoramic picture image or the like which is generated by joining sequential picture images together or panning picture images. Normally, when shooting sequential picture images or panning picture images, taking into consideration of various factors affecting precision imaging such as an error in a vertical motion of a camera relative to the motion of eyes, an error due to an inconstant speed of the camera relative to the speed of the eyes, and/or wobbling of hands, there must be used a specifically designed camera such as a horizontal camera HCM which moves horizontally in linear directions (parallax directions) with respect to an object OBJ as shown in FIG. 15A, or a rotary camera RCM which rotates on a horizontal plane at a fixed position as shown in FIG. 15B.

However, there were such problems associated with the related art that because the set-up of various related parameters in the imaging of the sequential picture images or panning picture images and in the printing of a panoramic picture image thus generated was executed separately, their processing was very complicated and time-consuming, and that without knowing these parameters well, a correct background picture image could not be obtained neither a correct panoramic picture image could be viewed through its printed material.

The present invention has been conceived to alleviate or solve these problems associated with the related art. It is desirable to provide a background picture image generation apparatus and a method thereof capable of recording a large-sized still picture image such as a panoramic picture image as a background picture image in printed material, for example, of a holographic stereogram, and enabling a reproduced image thereof to be viewed therethrough.

Further, it is preferable to provide a picture image generation apparatus capable of generating a large sized picture image like a panoramic picture image to be used in printed material such as of a holographic stereogram which is produced using a parallax picture image, and/or a printing apparatus for producing the printed material in which the large sized picture image generated above is recorded.

According to an embodiment of the present invention, a picture image generation apparatus for generating a picture image to be recorded in a holographic stereogram which is produced in accordance with parallax picture images string comprising a plurality of parallax picture images, and/or a printing section for printing the picture image thus generated are provided. The present apparatus embodying the present invention comprises: a picture image conversion section for converting a plurality of picture images inputted from outside or generated internally into the above-mentioned picture image to be recorded; and viewing point conversion section for generating a plurality of viewing point converted picture images in accordance with the picture image to be recorded which was generated by conversion in the picture image conversion section, wherein the above-mentioned viewing point conversion section generates the plurality of viewing point converted picture images so as to maintain a position of an image reproduced from the holographic stereogram at a predetermined distance from its viewing point.

A printed material production apparatus according to another embodiment of the present invention is an apparatus for producing printed material in accordance with parallax images, and comprises: an image input section for inputting a plurality of images; an image conversion section for conducting an image conversion processing over the plurality of images inputted via the image input section so as to convert these images into a panoramic image; a viewing point conversion section for generating a plurality of viewing point converted images in accordance with the panoramic image thus obtained; and a printing section for producing printed material in accordance with the plurality of viewing point converted images generated by the viewing point conversion section, wherein the viewing point conversion section generates the plurality of viewing point converted images so as to maintain a position of a reproduced image of the panoramic image reproduced from the printed material thus produced at a predetermined distance from its viewing point.

In the above-mentioned printed material production apparatus of the present invention, its picture image conversion section generates a panoramic picture image in accordance with the plurality of picture images having been obtained, its viewing point conversion section generates a plurality of viewing point converted picture images in such a way that the panoramic picture image may stay in the same position at a predetermined distance from its viewing point, and its printing section produces printed material in accordance with the plurality of viewing point converted picture images.

Further, a method of producing printed material according to another embodiment of the present invention is a method for producing printed material in accordance with parallax images, and comprises: a picture image inputting step of inputting a plurality of images; a picture image converting step of converting the plurality of images thus inputted into a panoramic image; a viewing point converting step of generating a plurality of viewing point converted images in accordance with the panoramic image generated above; and a step of printing printed material in accordance with the plurality of viewing point converted images obtained above, wherein in the viewing point converting step, the plurality of viewing point converted images are generated in such a way that a reproduced image of the panoramic image reproduced from the printed material may stay in the same position at a predetermined distance from its viewing point.

In the above-mentioned method for producing the printed material, the panoramic picture image is generated in accordance with the plurality of picture images inputted, and the plurality of viewing point converted images are generated in order that a reproduced image of the panoramic image may stay in the same position at a predetermined distance from its viewing point, then the printed material is produced in accordance with the plurality of these viewing point converted images.

A background picture image generation apparatus according to another embodiment of the present invention is an apparatus for generating a picture image to be recorded as a background picture image in printed material which is produced in accordance with a parallax picture image string comprising a plurality of parallax picture images, and comprises: a picture image generation section for generating a plurality of picture images using an imaging section or a virtual imaging section with their imaging (viewing) point changed in accordance with a time-spatial parameter which is inputted from an external section and is time and/or spatial information necessary in imaging or internal picture image generation; a picture image conversion section for converting the plurality of picture images generated above by the picture image generation section into a panoramic picture image to be recorded as a background picture image; and a viewing point conversion section for generating a plurality of viewing point converted picture images in accordance with the panoramic picture image generated above by the picture image conversion section, wherein the viewing point conversion section generates the plurality of viewing point converted picture images in accordance with the time/spatial parameter in order that a reproduced image of the panoramic picture image reproduced from the printed material may stay in the same position at a predetermined distance from its viewing point.

In the above-mentioned background picture image generation section, a plurality of picture images are generated by the picture image generation section in accordance with a desirable time-spatial parameter read in from external, a panoramic picture image to be recorded as a background picture image is generated upon conversion by the picture image conversion section in accordance with these plurality of the picture images generated above, and a plurality of viewing point converted picture images are generated upon conversion by its viewing point conversion section in accordance with the time-spatial parameter such that the panoramic picture image may stay in the same position at a predetermined distance from its viewing point.

A method of generating a background picture image according to another embodiment of the present invention is a method for generating a background picture image to be recorded in printed material which is produced in accordance with a parallax picture image string comprising a plurality of parallax picture images, and comprises: a picture image generating step of generating a plurality of picture images as imaged by an imaging apparatus or a virtual imaging apparatus while its imaging point being moved in accordance with a time-spatial parameter read in from external which is a time and/or spatial information necessary for its imaging or picture image generation; a picture image converting step of converting the plurality of picture images generated above in the picture image generating step into a panoramic picture image to be recorded as a background picture image; and a viewing point converting step for generating a plurality of viewing point converted picture images in accordance with the panoramic picture image generated above upon conversion in the picture image converting step, wherein in the viewing point converting step, the plurality of viewing point converted picture images are generated in accordance with the time-spatial parameters in order that a reproduced image of the panoramic picture image reproduced from the printed material thus produced may stay in the same position at a predetermined distance from its viewing point.

The method of generating the background picture image according to the above embodiment of the present invention: generates the plurality of picture images in accordance with the desirable time-spatial parameter read out from external; generates the panoramic picture image to record as the background picture image in accordance with these plurality of picture images generated above; and generates the plurality of viewing point converted picture images in accordance with the time-spatial parameter such that the panoramic picture image may stay in the same position at the predetermined distance from the viewing point.

BRIEF DESCRIPTION OF THE DRAWINGS

The above and other objects, features and advantages of the present invention will become more apparent from the following description of the presently preferred exemplary embodiment of the present invention taken in conjunction with the accompanying drawings, in which:

FIGS. 6A–6B are schematic diagrams showing an optical system of the printing section in the printed material production apparatus, in which FIG. 6A indicates an elevation view of the optical system, and FIG. 6B indicates a plan view thereof;

FIGS. 10A–10B are schematic diagrams illustrating the fundamental principle of the mapping conversion processing by the picture image processing section of the present invention, in which FIG. 10A shows the relationship between the projection image, the screen and the holographic surface in a plan view, and FIG. 10B shows the relationship in a side view;

FIG. 13 is a schematic diagram showing an exemplary manner how a panoramic image is generated;

FIGS. 15A–15B are diagrams showing conventional imaging methods using imaging cameras dedicated for use of taking sequential images or panning images, in which FIG. 15A shows a horizontal camera moving in linear directions with respect to an object, and FIG. 15B shows a rotary camera rotating horizontally at a fixed position with respect to the object;

DESCRIPTION OF THE PREFERRED EMBODIMENT

By referring to the accompanying drawings, a preferred embodiments of the present invention will be described in detail.

According to an embodiment of the present invention, a printed material production apparatus is provided. The apparatus is capable of supplying a two-dimensional still picture image as printed material. The printed material production apparatus, which may use a parallax picture image photograph obtained by using a lenticular technology and/or a parallax image printed material such as of a hologram or a holographic stereogram, produces a novel printed material, in which a large sized still picture image such as a so-called panoramic image is recorded. In the present apparatus, the printed material is to be positioned constantly at a predetermined distance from a viewing point. Further, notwithstanding being printed material, it allows entire information of the panoramic picture image to be observed through a display surface thereof the physical size of which is substantially smaller than that of the panoramic picture image, as if realized by means of a viewer software.

Figure 1:
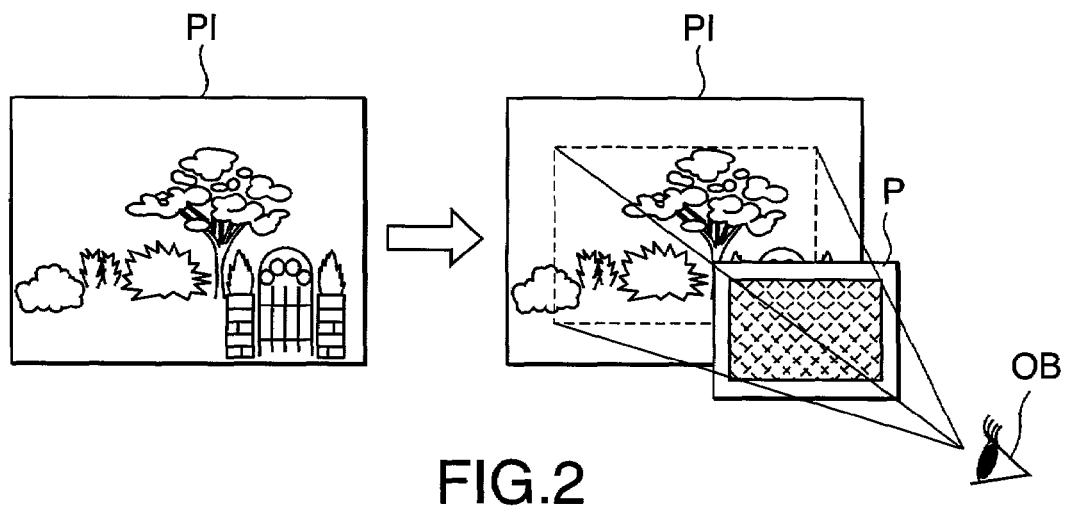
FIG. 1 is a schematic diagram illustrating a relationship between printed material produced by the printed material production apparatus embodying the present invention and a panoramic picture image reproduced from its printed material, in which an exemplary manner the viewer observes the panoramic still image through the printed material is illustrated conceptually.

For example, as shown in FIG. 1, a viewer OB is enabled to observe reproduced image of panoramic picture image PI as a still picture image through printed material P that is produced by the printed material production apparatus of the present embodiment. Here, it should be noted that in the printed material P, the picture image is recorded in such a manner that the reproduced image of the panoramic image PI appears at a predetermined distance either in front of the display surface of the printed material P or in the back thereof with respect to the viewer OB. In the instance example shown in the figure, the panoramic image PI is recorded such that the reproduced image thereof may stay in the same position at the predetermined distance which is deeper than the display surface of the printed material P with respect to the viewing point. Accordingly, the viewer OB is allowed to observe an area surrounded by broken lines in the panoramic image PI through the printed material P. Further, with reference to FIG. 2, the viewer OB is allowed to observe an area $PI_A$ surrounded by broken lines in the panoramic image PI by observing the printed material P from a viewing position A, and an area $PI_B$ surrounded by broken lines in the panoramic image PI by observing the printed material P from a viewing position B. Accordingly, by viewing the printed material P from different observation (viewing) points, the viewer OB may be able to view the entire information of the panoramic image PI through the display surface of the printed material P that has substantially smaller physical size than that of the panoramic image PI.

Now, the printed material production apparatus of the present embodiment capable of producing the printed material P as described above will be set forth in detail. In the following description, the printed material production apparatus will be described by way of an example that is capable of producing a holographic stereogram as printed material in which a holographic stereogram picture image is exposed and recorded.

Figure 3:
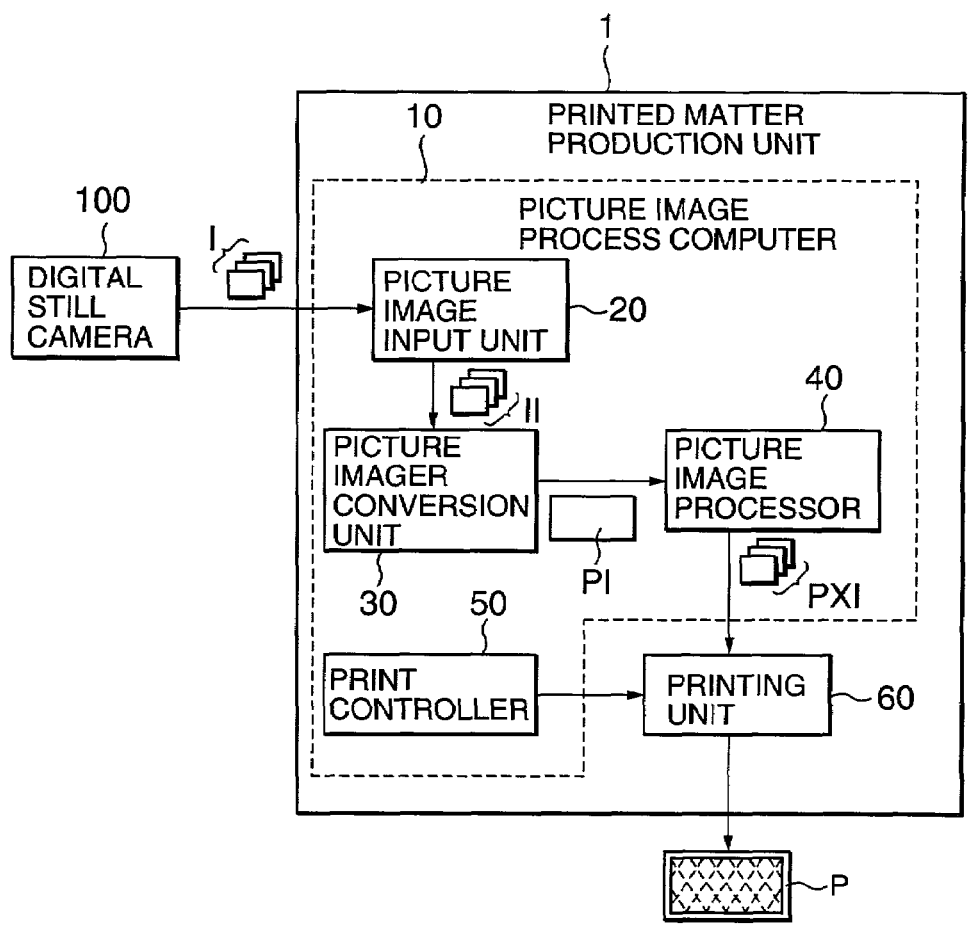
FIG. 3 is a block diagram indicating a constitution of the printed material production apparatus of the present invention.

Referring to FIG. 3, a printed material production apparatus 1 comprises a picture image processing computer 10 for processing picture image data, and a printing section 60 for producing printed material P in accordance with a viewing point converted picture image string PXI comprising a plurality of viewing point converted picture images generated by the picture image processing computer 10.

The picture image processing computer 10 comprises: a picture image input section 20 functioning as picture image input means for inputting a picture image string I comprising a plurality of picture images; a picture image conversion section 30 functioning as picture image conversion means for converting a inputted picture image string II comprising the plurality of picture images inputted through the picture image input section 20 into a panoramic picture image; a picture image processing unit 40 functioning as viewing point conversion means for generating a viewing point converted picture image string PXI comprising a plurality of viewing point converted picture images in accordance with the panoramic picture image PI generated by the picture image conversion section 30; and a print controller 50 for controlling the printing section 60.

The picture image input section 20 is used to input the picture image string I comprising at least two or more sequential or panning picture images taken with a digital still camera 100, a so-called video camera recorder or the like. The picture image input section 20 inputs the picture image string I, for example, via: a magnetic recording medium such as a flexible disk, a hard disc or the like; an optical recording medium such as a CD-ROM (Compact Disc-Read Only Memory), a CD-R (Compact Disc-Recordable) or a DVD (Digital Versatile Disc); a magneto-optical recording medium such as MO (Magneto Optical) or the like; a semiconductor recording medium such as a memory stick (Trade Name), Compact Flash (Trade Name), Smart Media (Trade Name) or the like; various interfaces such as IEEE Standards 1394-1995 for a High Performance serial Bus Std., SCSI (Small Computer System Interface), RS-232C or the like; as well as various network interfaces including such as Ethernet (Trade Name), public telephone lines or the like.

Further, it is desirable that each picture image constituting the picture image string I is affixed with a record of related information such as an imaging distance to an object, a resolution at a focal surface and/or a viewing angle (a picture angle) such as a focal distance, as well as a type and name of a camera or the like used in the imaging. The various related information is preferably recorded as affixed to each picture image data, for example, in compliance with Picture Image File Format Standards Exif version 2.1, the Digital Still Camera Picture Image File Format Standards Exif Version 2.1, Japan Electronics Industry Promotion Association, 1998.

The inputted picture image string II comprising the plurality of picture images inputted through the picture image input section 20 is then supplied to the picture image conversion section 30.

The picture image conversion section 30 converts the inputted picture image string II into the panoramic picture image PI by joining together the plurality of picture images constituting the inputted picture image string II. In the instant example, the picture image conversion section 30 generates the panoramic picture image PI using an arbitrary method. For example, the picture image conversion section 30 obtains geometrical and positional relationship among the images, the relationship including such as translational, rotational, enlargement, reduction or the like relations, by obtaining spatial correlations among respective picture images constituting the inputted picture image string II. Further, on the basis of the geometrical and positional relationship thus obtained as above, the picture image conversion section 30 executes a processing of overlaying and joining the images after execution of the above described spatial processing such as translational, rotational, enlargement, reduction or the like processing. Further, prior to overlaying and joining respective picture images, by determining an appropriate area to be overlaid and/or adjusting a overlaying angle between respective picture images in accordance with the spatial correlation between these respective picture images, the picture image conversion section 30 is enabled to generate the panoramic picture image PI so as that joining seams or stripes may be substantially eliminated or hardly visible.

By way of example, in case the viewing angle information described above is recorded in each picture image constituting the inputted picture image string II, the printed material production apparatus 1 can obtain viewing angle information of the synthesized panoramic picture image PI on the basis of their respective viewing angle information and their geometrical positional relationships between these respective picture images. Also, in case the information relating to the name and type of imaging apparatus described above is recorded instead of the viewing angle information in each picture image constituting the inputted picture image string II, a viewing angle information of each picture image may be obtained by pre-associating such viewing angle information with the name and type of the imaging apparatus. The viewing angle information is used in the mapping conversion processing in the picture image conversion apparatus 40, which will be described below.

Further, when generating the panoramic picture image PI, the picture image conversion section 30 may determine a spatial form of the panoramic picture image PI arbitrarily. For example, the spatial form may be planar, cylindrical or spherical. Alternatively, the picture image conversion section 30 may calculate the spatial form of such a panoramic picture image as if viewed through the fisheye lens and generate a likewise picture image PI. The fisheye lens displays a spherical panoramic picture image projected on a planar surface instead of a spherical surface. The picture image conversion section 30 records information relating to a projection method indicating in what spatial form the panoramic picture image PI is projected as affixed to the generated panoramic picture image PI. The information relating to the projection method is used in the mapping conversion processing in the picture image processing unit 40 to be described below.

The panoramic picture image PI generated in the picture image conversion section 30 as described above is supplied to the picture image processing unit 40.

The picture image processing unit 40 executes the mapping conversion processing (viewing point conversion processing) for positioning a reproduced image of the panoramic picture image PI that is to be reproduced as a holographic stereogram picture image viewed from a predetermined distance. Here, it should be noted that the mapping conversion processing is a processing for generating the viewing point converted picture images by reconstructing the panoramic picture image PI in such a way that a reproduced picture image of the panoramic picture image PI finally reproduced as a holographic stereogram from the printed material P may stay in the same position at a predetermined distance from the viewing point. In the mapping conversion processing, one of the parameters that should be determined in advance is distance information specifying at which predetermined distance a reproduced image of the panoramic picture image PI finally reproduced from the printed material P is to be positioned. In the case where the viewing angle information of the panoramic picture image PI is recognized, the picture image processing unit 40 computes such a predetermined distance at which the reproduced image is to be positioned in accordance with the viewing angle information. Alternatively, in the case where the information relating to the projection method of the panoramic picture image PI is known, the picture image processing unit 40 is able to generate a viewing point converted picture image string PXI using the information relating to the projection method thereof. Each of the plurality of viewing point converted picture images constituting the viewing point converted picture image string PXI generated above by the picture image processing unit 40 is supplied to the printing section 60 as an element hologram picture image (a hologram picture image element) which is a unit of display element to be displayed sequentially on a transmission type liquid crystal display when exposing and recording of the holographic stereogram is performed. As for the mapping conversion processing, it will be described in detail below.

The print controller 50 controls respective parts of the printed material production apparatus 1 and, in particular, the operation of the printing section 60.

The printing section 60, under the control of the print controller 50, produces the printed material P in accordance with the viewing point converted picture image string PXI comprising the plurality of viewing point converted picture images each of which constituting an element hologram picture image. Specifically, the printing section 60, which comprises an optical system with a predetermined construction for producing the holographic stereogram, produces a holographic stereogram by exposing and recording the plurality of viewing point converted picture images constituting the viewing point converted picture image string PXI as the element hologram picture images on a hologram recording medium, and by applying a predetermined fixing processing thereto. As to the construction of the printing section 60, it will be described in detail below.

Figure 2:
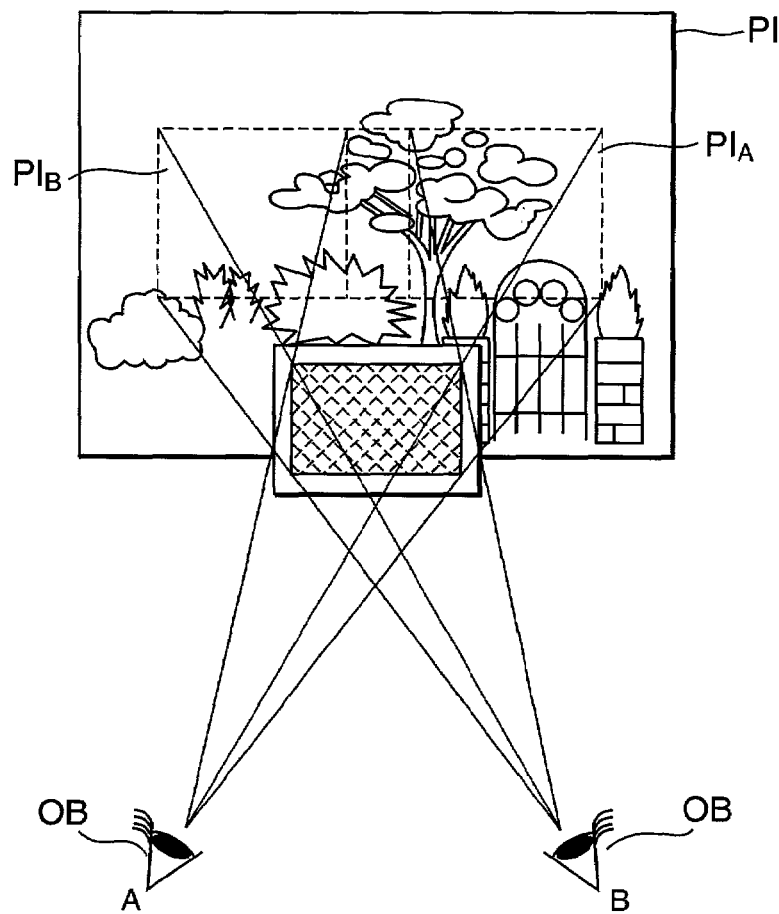
FIG. 2 is a schematic diagram illustrating the relationship between the panoramic image and the printed material, in which an idea how the viewer is enabled to observe the whole information of the panoramic image through the printed material by changing his/her viewing points is illustrated.

The printed material producing system 1 as described above produces the printed material P comprising the holographic stereogram having a display surface the physical size of which is substantially smaller than that of the panoramic picture image PI, which is realized by the steps of: generating a panoramic picture image PI in accordance with the picture image string I comprising a plurality of picture images; executing the predetermined mapping conversion processing so as that a reproduced image of the panoramic picture image PI may stay in the same position at a predetermined distance from its viewing point; and exposing and recording each of a plurality of the viewing point converted picture images constituting a viewing point converted picture image string PXI as each element hologram picture image on a hologram recording medium. Thereby, by viewing the printed material P produced as above by the printed material production apparatus 1 from different viewing points as shown in FIG. 2, the viewer OB can observe the entire information of the panoramic picture image PI through a relatively small display surface of the printed material.

In the case where a digital picture image data is used as its processing data in the printed material production apparatus 1 of the present embodiment, the picture image input section 20, the picture image conversion section 30, the picture image processing unit 40 and the printing controller 50 may be implemented not only by hardware, but also by software operable on the picture image processing computer 10.

Below, the constitution of the printing section 60 will be described in detail referring to FIGS. 4 to 7. First, principle of exposure and recording of the element hologram on the hologram recording medium will be described before the detail explanation of the printing section.

Figure 4:
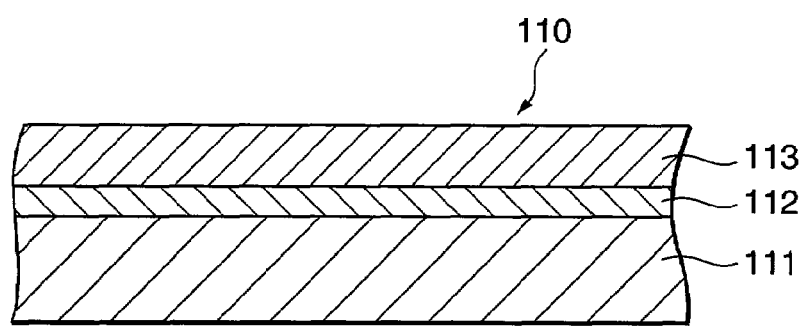
FIG. 4 is a cross-sectional view in part of a holographic recording medium for use in the printed material production apparatus of the present invention.

With reference to FIG. 4, a hologram recording medium 110 used here is a so-called film coated type recording medium which is provided by forming a photopolymer film 112 comprising an optically polymerizing photopolymer, for example, on a long sized base film 111, then by coating a cover film 113 on the surface of the photopolymer film 112.

Figure 5A:
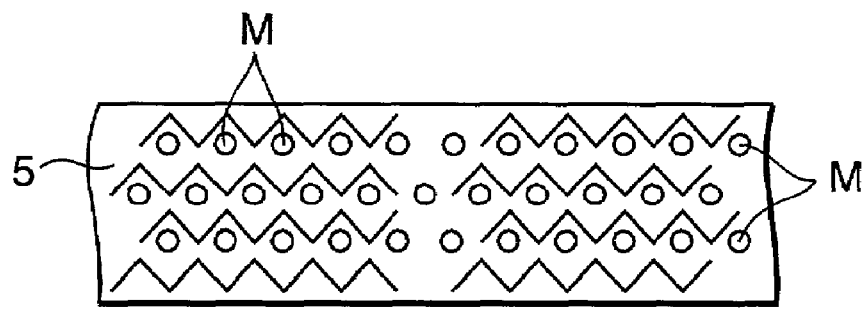
FIGS. 5A–5C are diagrams showing photosensitizing processes of the holographic recording medium, in which FIG. 5A indicates an initial state thereof, FIG. 5B indicates an exposed state, and FIG. 5C indicates a fixed state.
Figure 5B:
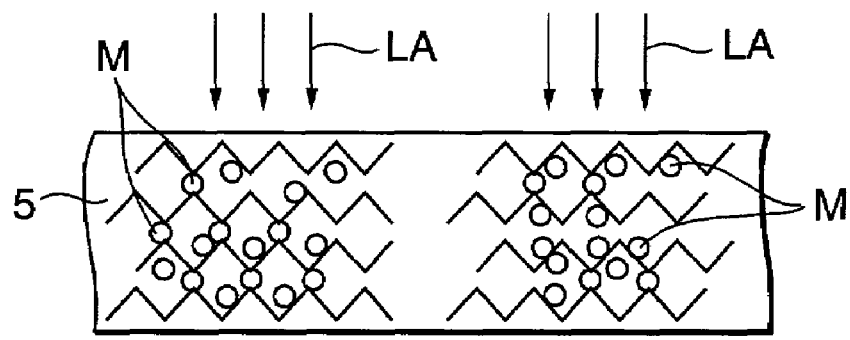
Figure 5C:
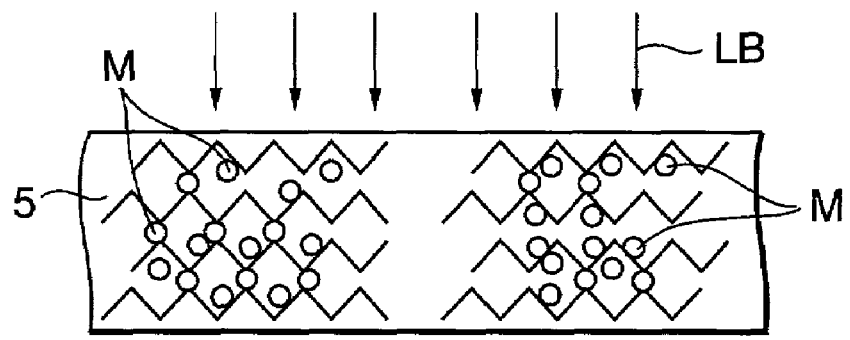

In the hologram recording medium 110 described above, in the initial state of the optically polymerizing photopolymer constituting the photopolymer layer 112, its monomers M are uniformly distributed in a matrix polymer as shown in FIG. 5A. Upon irradiation of a laser beam LA with a power from 10 mJ/cm$^2$ to 400 mJ/cm$^2$, the monomers M uniformly distributed in the matrix polymer are polymerized in an exposed portion thereof to achieve a polymerized state as shown in FIG. 5B.

In the optically polymerizing photopolymer, as its polymerization advances, the monomers M migrates from their surroundings to cause non-uniformity of the density distribution thereby causing variation in a refractive index between the exposed and the non-exposed portions. Then, the entire part of the optically polymerizing photopolymer is irradiated with a ultraviolet ray or a visible light having a power of approximately 1000 mJ/cm$^2$ so as to complete the polymerization of the monomers M in the matrix polymer. Because that the photo-polymerizing photopolymer constituting the photopolymer layer 112 changes its refraction index in accordance with the laser beam LA irradiated, the hologram recording medium 110 is exposed to record interference fringes generated by interference between the object light and the reference light as the variation in the refractive index.

By use of the film coated type recording medium with the photopolymer layer 112 comprising the above-mentioned photo-polymerization type photopolymer as its hologram recording medium 110, it eliminate need for the printing section 60 to apply a normally practiced developing process to the hologram recording medium 110 after its exposure. Accordingly, the printing section 60 does not require the conventional developing apparatus or the like, thereby simplifying its construction and enabling to speed up the production of the holographic stereogram.

The printing section 60, which produces the printed material P of a holographic stereogram by exposing and recording the holographic stereogram picture image onto the aforementioned hologram recording medium 110, has an optical system 70 for producing the holographic stereogram as shown in FIG. 6A. In the printing section 60, each component and part constituting the optical system 70 is disposed and supported on a supporting plate (optical table, not indicated), and the supporting plate is mounted on an apparatus housing via a damper. The optical system 70 comprises an incident light optical system 70A, an object light optical system 70B and a reference light optical system 70C. In order to produce its holographic stereogram as the printed material P. because the printing section 60 uses a hologram recording medium 110 which is a photosensitive material, the housing of the system has a light-tight construction at least for the optical system 70.

The incident light optical system 70A has a laser beam source 71 for emitting a laser beam L1 with a predetermined wavelength, a shutter mechanism 72 disposed on an optical axis of the laser beam L1 emitted from the laser beam source 71 for passing the laser beam L1 to a subsequent stage or interrupting, and a half mirror 73 for splitting the laser beam L1 into an object light L2 and a reference light L3.

The laser beam source 71 comprises a laser apparatus capable of emitting the laser beam L1 having a mono wavelength and a good interference such as a semiconductor excited YAG laser apparatus, a water cooled argon ion laser apparatus, a water cooled krypton laser apparatus or the like.

The shutter mechanism 72 operates in response to a control signal output from the print controller 50 described above to open and close its shutter in synchronism with an output timing of each of the viewing point converted picture images that becomes an element hologram picture image to constitute the viewing point converted picture image string PXI so as to pass or interrupt the laser beam L1 to the subsequent optical system.

The half mirror 73 splits the laser beam L1 incident thereon into a transmission laser beam and a reflected laser beam. Out of the laser beam L1, the transmission laser beam is used as the object light L2 described above while the reflected laser beam is used as the reference light L3. The object light L2 and the reference light L3 are directed to enter the subsequent optical stages of the object light optical system 70B or the reference light optical system 70C, respectively.

In the incident optical system 70A there may be provided mirrors or the like (not shown) in order to make the optical path lengths of the object light L2 and the reference light L3 identical by deflecting their paths appropriately. Further, the shutter mechanism 72 may be either a mechanical drive system, an electronic shutter using AOM (acousto-optic modulation) or the like. That is, any shutter mechanism 72 if capable of opening and closing the shutter to pass or interrupt the laser beam L1 may be used.

The object light optical system 70B is provided with optical components and parts such as a mirror 74, a spatial filter 75, a collimator 76, a projection lens 77, a cylindrical lens 78, a mask 79 and so on, which are arranged sequentially along the optical axis from the side of incidence as shown in FIGS. 6A–6B.

The mirror 74 reflects the object light L2 having passed through the half mirror 73. The object light L2 reflected on the mirror 74 enters the spatial filter 75.

The spatial filter 75, which is built by combining, for example, a convex lens and a pin hole, spreads the object light L2 having been reflected on the mirror 74 in isotropic directions corresponding to a width of a display surface of a transmission type liquid crystal display 80 to be described later.

The collimator lens 76 collimates the object light L2 spread by the spatial filter 75 and guides a collimated object light to the transmission type liquid crystal display 80.

The projection lens 77 slightly diffuses the object light L2 and projects onto the cylindrical lens 78. The projection lens 77 contributes to an improvement in the quality of a holographic stereogram to be produced by the effect of a slightly diffused object light L2.

The cylindrical lens 78 converges the collimated object light L2 in horizontal directions.

The mask 79 which has a slit-like opening allows a part of the object light L2 having been converged by the cylindrical lens 78 to pass through the slit opening to be incident on the hologram recording medium 110.

Further, in the object light optical system 70B, the transmission type liquid crystal display 80 is disposed between the collimator lens 76 and the projection lens 77. On the transmission type liquid crystal display 80 there are sequentially displayed the viewing point converted picture images as the element hologram picture images on the basis of the viewing point converted picture image string PXI supplied from the picture image processing unit 40 described above. In the printing section 60, the control signal output from the print controller 50 corresponding to the output timing of the viewing point converted picture image string PXI from the picture image processing unit 40 is supplied to a recording medium transport mechanism 84 for controlling its transport operation of the hologram recording medium 110.

In the object light optical system 70B described above, the object light L2 in the form of a narrow beam split from the incident light optical system 70A is spread by the spatial filter 75 and collimated by the collimator lens 76. Further, in the object light optical system 70B, the object light L2 incident on the transmission type liquid crystal display 80 via the collimator lens 76 is modulated (undergoes a picture image modulation) by the element hologram picture image displayed on the transmission type liquid crystal display 80, then enters the cylindrical lens 78 via the projection lens 77. During an open state of the shutter mechanism 72, the object light optical system 70B causes the object light L2 having been modulated by the element hologram picture image to enter the hologram recording medium 110 via the slit opening in the mask 79 to expose and record in accordance with respective element hologram picture images.

The reference light optical system 70C has optical components and parts including a spatial filter 81, a collimator lens 82 and mirror 83, which are arranged sequentially along its optical axis from its side of incidence.

The spatial filter 81, which is different from the spatial filter 75 provided in the object light optical system 70B and is built, for example, by combining a cylindrical lens and a slit, spreads the reference light L3 having been split and reflected by the half mirror 73 so as to have a predetermined width in one dimensional direction, more specifically, to spread to have a width corresponding to the width of a display surface of the transmission type liquid crystal display 80.

The collimator lens 82 collimates the reference light L3 having been spread by the spatial filter 81.

The mirror 83 reflects the reference light L3 to lead to the rear surface of the hologram recording medium 110 to be incident thereon.

The above-mentioned optical system 70 is constructed such that the optical path lengths both of the object light optical system 70B through which the object light L2 having been split by the half mirror 73 passes and the reference light optical system 70C through which the reference light L3 passes become substantially the same. Accordingly, the optical system 70 in which the interference between the object light L2 and the reference light L3 is substantially improved can produce a holographic stereogram capable of reproducing a sharp and clearer picture image.

Figure 7:
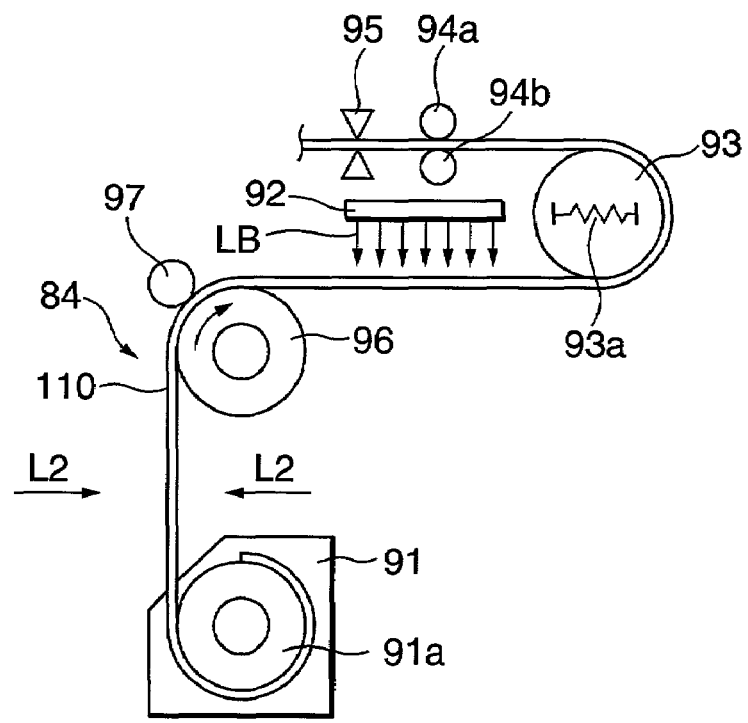
FIG. 7 is a schematic diagram showing a construction of a recording medium transport system provided in the printing section.

Further, the printing section 60 is provided with a recording medium transport mechanism 84 for intermittently transporting (feeding) the hologram recording medium 110 by a length of one element hologram at one time in a direction indicated by an arrow a in FIG. 6B. By the recording medium transport mechanism 84, the hologram recording medium 110 is transported along a recording medium drive system as shown in FIG. 7. The hologram recording medium 110 which is supplied as a long-sized photosensitive film which is, for example, wound around a feeder roll 91a which is mounted rotatably in a light-tight film cartridge 91. When the film cartridge 91 is loaded into the printer apparatus 60, the hologram recording medium 110 is fed into the printer apparatus 60 to move along the recording medium feeder system driven by the recording medium transport mechanism 84.

As shown in FIG. 7, the recording medium feeder system comprises the feeder roller 91a described above, the recording medium transport (drive) mechanism 84, a heat roller 93, a pair of discharge rollers 94a and 94b, a cutter 95 and so on, all of them being arranged approximately in a shape of character "S". In the recording medium feeder system, a ultraviolet lamp 92 is disposed between the recording medium drive mechanism 84 and the heat roller 93.

The recording medium drive mechanism 84 comprises a drive roller 96 for driving the hologram recording medium 110 fed from the film cartridge 91, a pinch roller 97 to follow the rotation of the drive roller 96, and a stepping motor or the like (not shown) as a drive source of the drive roller 96. By the recording medium drive mechanism 84, because the drive roller 96 is rotated intermittently by the stepping motor in response to the control signal supplied from the print controller 50, the hologram recording medium 110 is intermittently transported as pinched between the drive roller 96 and the pinch roller 97.

The ultraviolet lamp 92 which is disposed between the drive roller 96 and the heat roller 93 as described above irradiates a ultraviolet ray LB of approximately 1000 mJ/cm$^2$ over the hologram recording medium 110 in which the holographic stereogram produced by the interference fringes between the object light L2 and the reference light L3 was exposed and recorded so as to complete the polymerization of the monomers M in the matrix polymer.

The heat roller 93 transports the hologram recording medium 110 which is wound around a circumference of the roller 93 with a winding angle of approximately a half circumference thereof. Further, the heat roller 93 is provided with a heater 93a inside thereof, and is maintained at approximately 120° C., thereby enabling to heat the hologram recording medium 110 and to enhance the modulation of the refractive index in the photopolymer layer 112.

The discharge rollers 9a and 94b are intermittently driven in synchronism with the drive roller 96 by the stepping motor which is driven in response to the control signal sent from the printing controller 50. The discharge rollers 94a and 94b intermittently feed out the hologram recording medium 110 by a length corresponding to one element hologram every time the exposure and recording of the one element hologram picture image is completed. Thereby, the hologram recording medium 110 is secured to be driven by the discharge rollers 94a, 94b and the recording medium transport mechanism 84 in a state tightly contacting the outer circumference of the heat roller 93 without dipping or sagging.

A cutter 95, which is actuated by a drive mechanism (not shown) to operated in response to the control signal supplied from the print controller 50 described above, cuts the hologram recording medium 110 at a predetermined length, namely, at a length corresponding to each holographic stereogram picture image.

The printing section 60 which is provided with the above-mentioned optical system 70 and the recording medium transport system, every time upon completion of the exposure and recording of the one element hologram picture image, and in response to the control signal corresponding to the one element hologram sent from the printing controller 50 to its recording medium transport mechanism 84, moves and stops the hologram recording medium 110 along its transport path by a length corresponding to one element hologram in order that an unexposed portion thereof is positioned between the feeder roller 91a and the drive roller 96 while both optical axes of the object light optical system 70B and of the reference light optical system 70C are arranged so as to become perpendicular to the front and the rear surfaces, respectively. The printing section 60 is constructed in such a way that any vibration caused by the transport operation of the hologram recording medium 110 is quickly damped and stopped.

Under the above-mentioned conditions and with the shutter mechanism 72 opened, the printing section 60 causes the object light L2 having been subjected to the picture image modulation and the reference light L3 to be incident on the hologram recording medium 110 from the front surface and the rear surface respectively so as to expose and record each interference fringe corresponding to each element hologram picture image. In response to the control signal sent from the printing controller 50 to the recording medium transport mechanism 84 upon completion of the exposure and recording of any one element picture image, the printing section 60 immediately transports the hologram recording medium 110 by a predetermined length to pause there.

Further, the printing section 60 performs a fixing process including a ultraviolet irradiation process for the hologram recording medium 110 using a ultraviolet lamp 92 in the recording medium transport system and a heating process therefor at the predetermined temperature by use of the heat roller 93, thereby fixing the exposed and recorded holographic stereogram picture image in the hologram recording medium 110. The printing section 60 cuts out the hologram recording medium 110 after completion of the fixing process with a cutter 95 sequentially into a predetermined size per holographic stereogram picture image, pastes it on a mount sheet or the like if required, and discharges it as printed material P comprising one holographic stereogram.

By sequentially performing these steps of operation described above, the printing section 60 generates a respective holographic stereogram and produces a respective printed material P thereof.

Now, in the following, the mapping conversion processing (viewing point conversion processing) executed in the picture image processing unit 40 for generating the viewing point converted picture image string PXI as the element hologram picture image to be displayed on the transmission type liquid crystal display 80 in the printing section 60 will be described in detail. Here, for simplification of the description, it is described by way of example in which the panoramic picture image PI is recorded in the printed material P as converted into the plurality of viewing point converted picture images so as to effectuate that a reproduced image of the panoramic picture image PI reproduced from its printed material P may stay in the same position at a predetermined distance in a deep field in the backward of the display surface of the printed material P remote from its viewing point.

Figure 8:
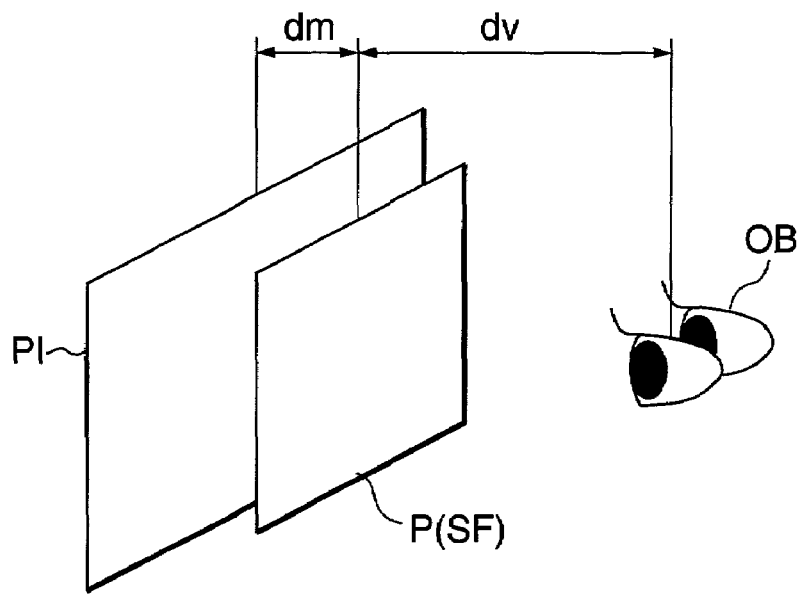
FIG. 8 is a schematic diagram showing an outline of a mapping conversion processing by an image processing section provided in the printed material production apparatus of the present invention, in which it is shown how the panoramic image of a holographic stereogram is reproduced from the printed material which is produced as the holographic stereogram by the mapping conversion processing.

In the printed material production apparatus 1, by applying the mapping conversion processing to the panoramic picture image PI by the picture image processing unit 40 as described above, there is generated the viewing point converted picture image string PXI comprising the plurality of viewing point converted picture images each of which to be exposed and recorded as an element hologram picture image on the hologram recording medium 110 in the printing section 60. In the printed material production apparatus 1, by execution of the mapping conversion processing, as schematically illustrated in FIG. 8, the printed material P may be produced that enables the panoramic picture image PI to be reproduced as a holographic stereogram picture image at a predetermined location in a deep field separated by a predetermined distance "f" from a display surface of the printed material P, which is a hologram surface SF that is separated from the viewer OB by a predetermined distance "e". The general principle of the mapping conversion processing has been disclosed in the JP-A Laid-Open No. 11-109839 filed by the same applicants of the present application in which two-dimensional picture image information including character strings and picture images is exposed and recorded as synthesized with a holographic stereogram picture image at an arbitrary depth in the hologram recording medium. This general principle will be described briefly with reference to FIGS. 9 to 12.

Figure 9:
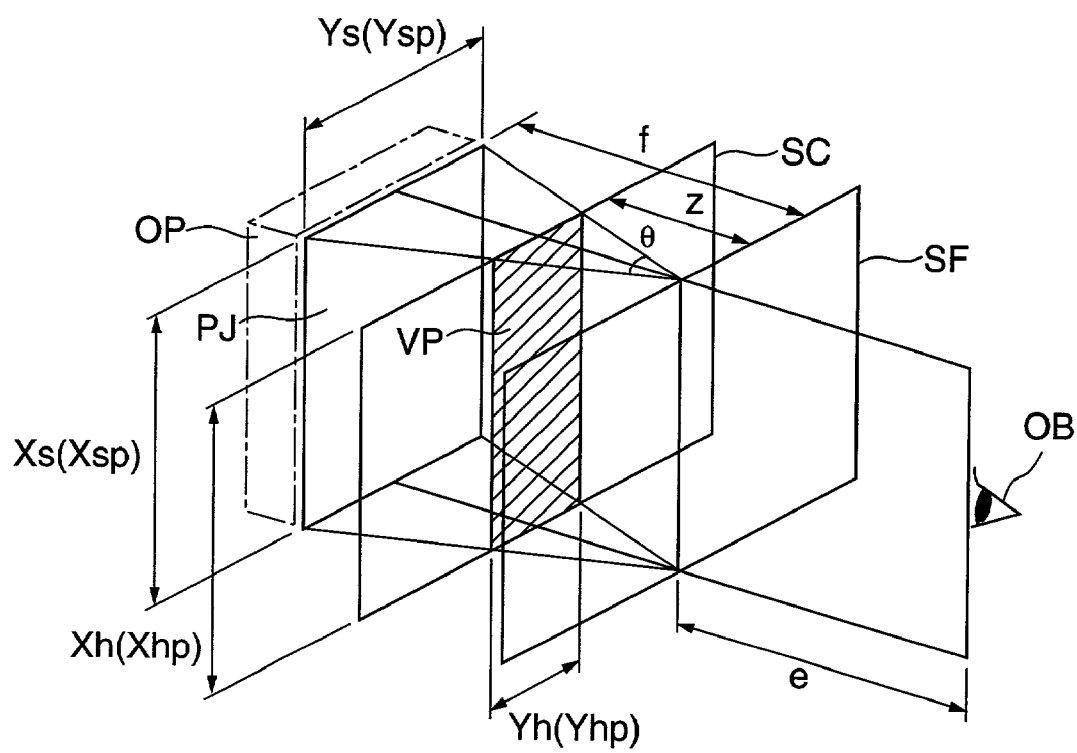
FIG. 9 is a schematic diagram indicating a fundamental principle of the mapping conversion processing by the picture image processing section of the present invention, and illustrates a relationship between a projection image, a virtual projection image projected on a screen and a holographic surface.

A holographic stereogram is produced using an optical system similar to the optical system 70 in the above-mentioned printing section 60. Its object light transmitted through its display apparatus corresponding to the above-mentioned transmission type liquid crystal display 80 is converged in horizontal directions through an optical member OP corresponding to the above-mentioned cylindrical lens 78 and impinges on its hologram recording medium as shown in FIG. 9.

Here, it should be noted that a picture image corresponding to an element hologram picture image to be exposed and recorded by the object light having transmitted the display apparatus is referred to as a projection picture image PJ, and that a display surface to which a converging point of the object light belongs is referred to as a hologram surface SF. Further, a surface deeper by "z" than the hologram surface SF on which the picture image is exposed and recorded is referred to as a screen surface SC. The screen surface SC is a virtual surface, on the region of which depicted by slant lines is supposed to be projected a picture image. The picture image to be projected on the screen surface SC is referred to as a virtual projection image VP. The virtual projection image VP corresponds to the picture image actually to be exposed and recorded at the predetermined depth "z" mm.

Further, it is assumed that a length in the horizontal direction (parallax direction) of the projection picture image PJ is Ys (mm) and a length in the vertical direction (non-parallax direction) thereof is Xs (mm), and that the number of pixels in the horizontal direction thereof is Ysp (pixels) and the number of pixels in the vertical direction thereof is Xsp (pixels). Still further, it is assumed that a length in the horizontal direction (parallax direction) of the virtual projection image VP is Yh (mm) and a length in the vertical direction (non-parallax direction) thereof is Xh (mm), and that the number of pixels in the horizontal direction thereof is Yhp (pixels) and the number of pixels in the vertical direction thereof is Xhp (pixels). The length Xh (mm) in the vertical direction of the virtual projection image VP is equal to the length Xs (mm) in the vertical direction of the projection picture image PJ, thereby the number of pixels Xhp in the vertical direction of the virtual projection image VP is equal to the number of pixels Xsp in the vertical direction of the projection picture image PJ. Further, as for the number of pixels Yhp in the horizontal direction of the virtual projection image VP, it is desirable to be a value obtained by multiplying the number of pixels Xsp in the vertical direction of the projection picture image PJ by an aspect ratio of the virtual projection image VP. That is, the number of pixels Yhp in the horizontal direction of the virtual projection image VP is expressed preferably by the following equation (1).

$$Yhp = Xsp \times (Yh/Xh) \tag{1}$$

Further, assuming its focal distance to be f (mm) and its converging angle to be $\theta$, the optical part OP for converging the projection picture image PJ satisfies the following equation (2)

$$\theta = \tan^{-1}(Ys/f) \tag{2}$$

Still further, a distance from the viewing point by the viewer to the hologram surface SF is assumed to be e mm.

Under these conditions described above, as shown in FIG. 10A, a virtual projection image VP is projected from a point PP in the horizontal direction to the hologram surface SF into a region inclusive of the screen surface SC. Accordingly, only a portion of pixels Yhp×Yi/Yh extracted from the whole number of pixels Yhp in the horizontal direction of the virtual projection image VP may be projected on the screen surface SC, where Yi is given by the following equation (3), $$Yi = 2 \times z \times \tan(\theta/2) \tag{3}$$

As can be clearly understood from the aforementioned principle of the present invention, in the mapping conversion processing in order for the picture image to be exposed and recorded at a depth of a predetermined value z (mm) in the hologram recording medium, it is not restricted at all by the distance e (mm) between the viewing point by the viewer and the hologram surface SF.

Figure 10A:
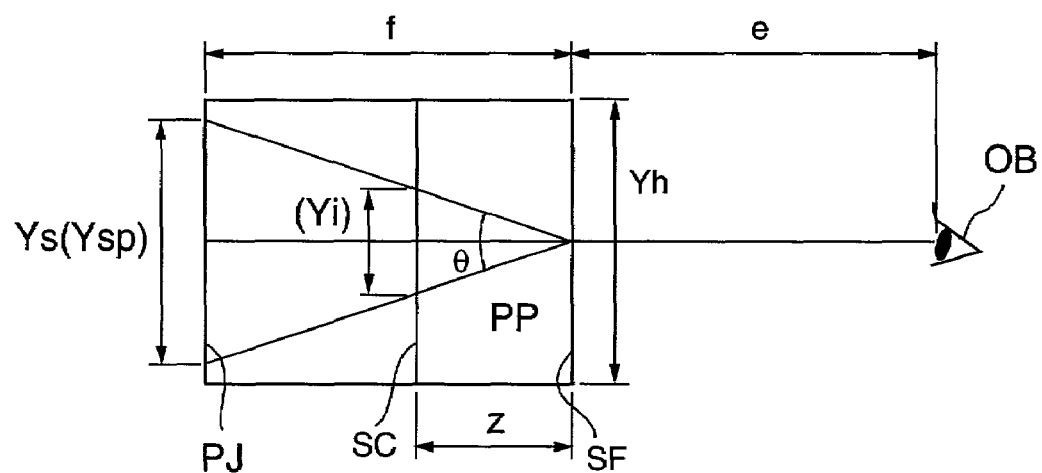
Figure 10B:
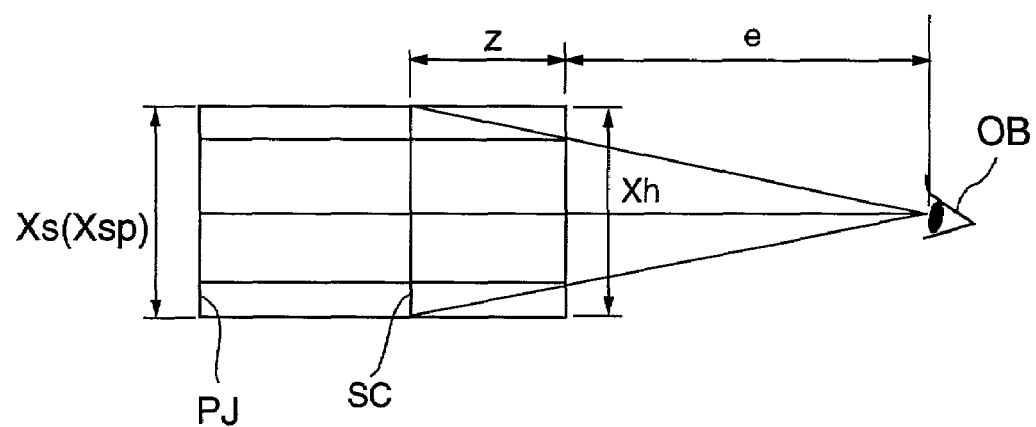

On the other hand, as shown in FIG. 10B, because the picture image is exposed and recorded at the predetermined depth of z (mm) from the hologram surface SF, the projection picture image PJ must be reduced in the vertical direction on the hologram surface SF by a reduction ratio of e/(e+z). The projection picture image PJ is exposed and recorded as it is with its length (Xs×e/(e+z)) (mm) in the vertical direction on the hologram surface SF not being enlarged nor reduced subsequent from the screen surface SC. Accordingly, on the screen surface SC, only a portion of pixels (Xhp×p×e/ (e+z)) extracted from the whole number of pixels Xhp in the vertical direction of the virtual projection image VP may be projected.

Further, in the mapping conversion processing, it is necessary to consider a relationship between a shifting pitch dy (mm) on the hologram surface SF and a center position of a cut-out region on the screen surface SC. When generating a picture image corresponding to an element hologram picture image to be displayed on the display apparatus, such a relationship will be satisfied if a shifting condition of (Yhp×dy/Yh) (pixel) is given to its original picture image.

Figure 11:
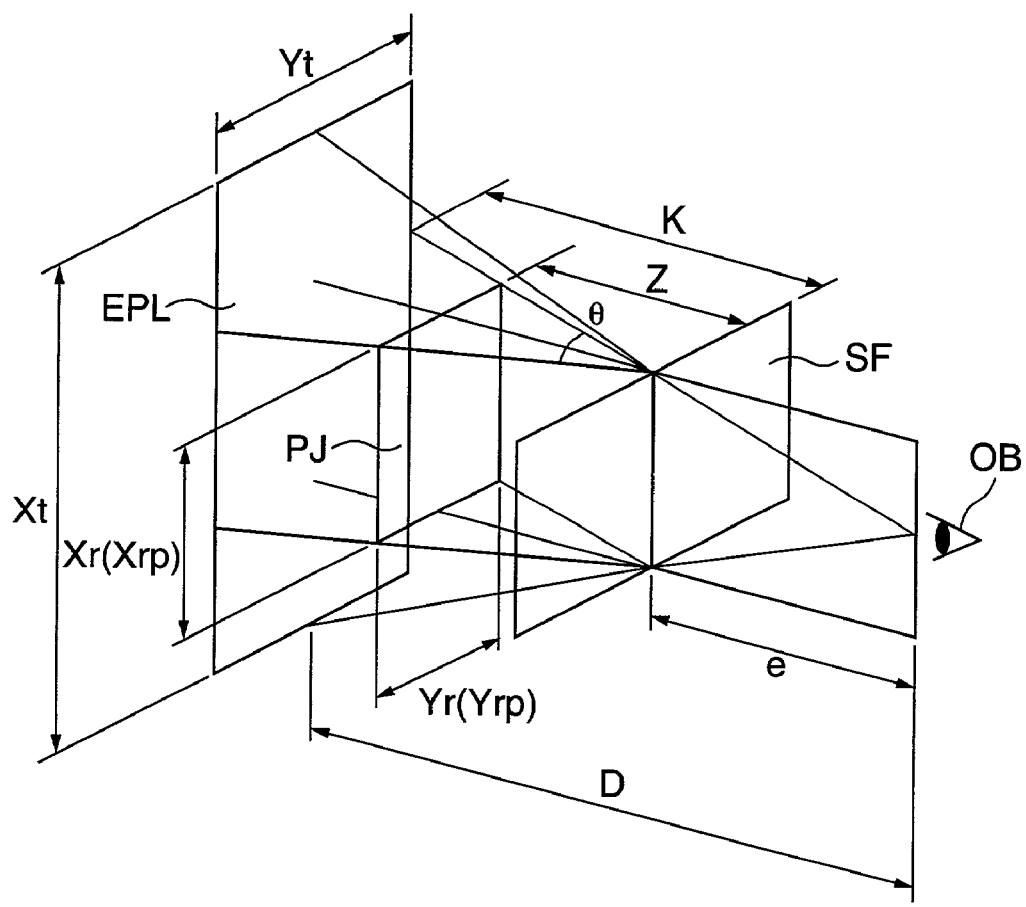
FIG. 11 is another schematic diagram illustrating the fundamental principle of the mapping conversion processing by the picture image processing section of the present invention, in which a relationship between one elementary hologram picture image with its viewing point converted by the mapping conversion processing, a picture image corresponding thereto and a reproduced image therefrom is indicated.

A relationship between a picture image corresponding to one element hologram picture image the viewing point of which was converted by the mapping conversion processing and a reproduced image thereof is summarized as shown in FIG. 11. It is assumed here that a length in the horizontal direction (parallax direction) of the projection image picture PJ is Yr (mm), which projection image picture PJ was exposed and recorded by the object light having transmitted the display apparatus corresponding to the above-mentioned transmission type liquid crystal display 80 displaying the picture image subjected to the mapping conversion processing at a depth z (mm) in the hologram recording medium, and a length in the vertical direction (non-parallax direction) thereof is Xr (mm), and that the number of pixels in the horizontal direction is Yrp (pixel), and the number of pixels in the vertical direction is Xrp (pixel). In addition, a resolution Mr (pixel/mm) in the vertical direction of the projection picture image PJ is expressed by the following equation (4), $$Mr=Xrs/Xr(\text{pixel}/mm) \quad (4)$$

At this time, if it is assumed that a reproduced image EPL of the element hologram which was exposed and recorded by the projection picture image PJ may stay in the same position at a predetermined virtual distance D (mm) in a deep field in the backward of the hologram surface SF from the viewing point of the viewer OB, and that a distance between the viewing point of the viewer OB and the hologram surface SF is e (mm), a virtual distance from the hologram surface SF to the reproduced image EPL is k (mm), which is a difference between the distance D and e.

In this instance, regarding a size of the reproduced image EPL, assuming a length in the horizontal direction (parallax direction) of the reproduced image EPL to be Yt (mm), and a length in the vertical direction (non-parallax direction) thereof to be Xt (mm), they are expressed by the following equations (5) and (6), respectively, $$Yt=(Yr/z)\times k=2\times\tan(\theta/2)\times k \quad (5)$$

$$Xt=(Xr/e)\times D=(Xr/e)\times(e+k) \quad (6)$$

Further, a resolution Mt (pixel/mm) in the vertical direction of the reproduced image EPL with respect to the resolution Mr of the picture image corresponding to the one element hologram picture image the viewing point of which was converted is expressed by the following equation (7), $$Mt=Mr\times(Xr/Xt)=Mr\times(e/D) \quad (7)$$

Figure 12:
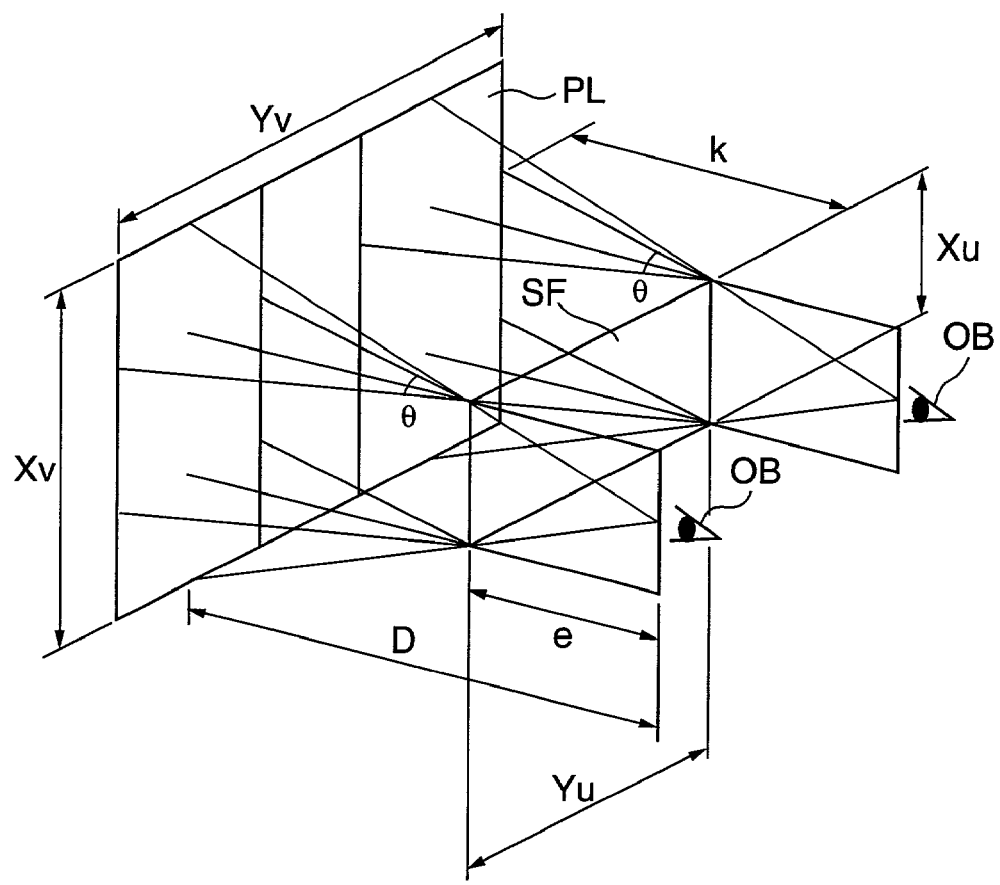
FIG. 12 is a still another schematic diagram illustrating the fundamental principle of the mapping conversion processing by the picture image processing section of the present invention, in which a relationship in terms of the sizes of a holographic stereogram finally produced and of a reproduced image thereof is indicated.

Still further, a relationship in terms of the size of a reproduced image to the size of the holographic stereogram finally produced is summarized as shown in FIG. 12.

A size of the reproduced image PL reproduced from the whole portion of the generated holographic stereogram is determined by a gap between its reproduced images EPL of the element holograms existing on both sides thereof. That is, if a length in the horizontal direction (lateral size) in the holographic stereogram is assumed to be Yu (mm), and a length in the vertical direction (vertical size) thereof is assumed to be Xu (mm), the gap between two element holograms located on both sides thereof is Yu (mm). Then, as shown in FIG. 11, because that the length in the horizontal direction (parallax direction) in the reproduced image EPL reproduced according to the element hologram (hologram element) is Yt (mm), and that the length in the vertical direction (non-parallax direction) is Xt (mm), as to the size of the reproduced image PL, if assumed its length in the horizontal (parallax) direction being Yv (mm) and its length in the vertical (non-parallax) direction being Xv (mm), they are given by the following equations (8) and (9), respectively, $$Yv=Yu+Yt=Yu+(Yr/z)\times k \quad (8)$$

$$Xv=Xt=(Xr/e)\times D=(Xr/e)\times(e+k) \quad (9)$$

Further, a resolution Mv (pixel/mm) in the vertical direction of the reproduced image PL relative to the picture image corresponding to the one element hologram picture image the viewing point of which was converted is not changed and is expressed by the following equation (10), $$Mv=Mt=Mr\times(Xr/Xt)=Mr\times(e/D) \quad (10)$$

It is noted here that the vertical direction in the holographic stereogram is the non-parallax direction, and because that the projection picture image PJ projected by the object light is exposed and recorded as the element hologram with the same magnification at least in the vertical direction, as for the relation in terms of sizes between the projection picture image PJ and the holographic stereogram, there holds that Xr=Xu.

Now, in the printed material production apparatus 1, while the picture image conversion section 30 described above generates the panoramic picture image PI, the picture image processing unit 40 described above executes the mapping conversion processing utilizing the principle explained above having such specific relationships described above in order to effectuate that a reproduced image of the panoramic picture image PI reproduced as a holographic stereogram picture image may stay in the same position at a predetermined distance from the viewing point of the viewer. At this instance, the picture image processing unit 40 determines the predetermined distance D from the viewing point at which the reproduced image of the panoramic picture image PI is to be positioned constantly according to either one of the following three methods. Here, referring to FIG. 13, it will be described by way of example where the mapping conversion processing is applied to a panoramic picture image PI generated from an inputted picture image string II comprising 6 picture images $II_1$, $II_2$, $II_3$, $II_4$, $II_5$ and $II_6$ taken by the digital still camera 110.

Here, it is assumed that respective picture images $II_1$, $II_2$, $II_3$, $II_4$, $II_5$ and $II_6$ constituting the inputted picture image string II were taken with the digital still camera 100 at a horizontal picture angle (viewing angle) of 40 degrees and a vertical picture angle (viewing angle) of 30 degrees, and that the number of pixels therein (the horizontal direction×the vertical direction) is 1280×960 pixels. In this case, if the picture image conversion section 30 is supposed to generate a panoramic picture image PI having the number of pixels in the horizontal direction and the vertical direction to be 2880×1620 (pixels), the panoramic picture image PI corresponds to a picture image having a horizontal viewing angle of 90 degrees and a vertical viewing angle of 50.625 degrees.

For such a panoramic picture image PI as described above, the picture image processing unit 40 determines its predetermined distance from the viewing point at which the reproduced image of the panoramic picture image PI should be positioned constantly using either one of the following methods.

Figure 14A:
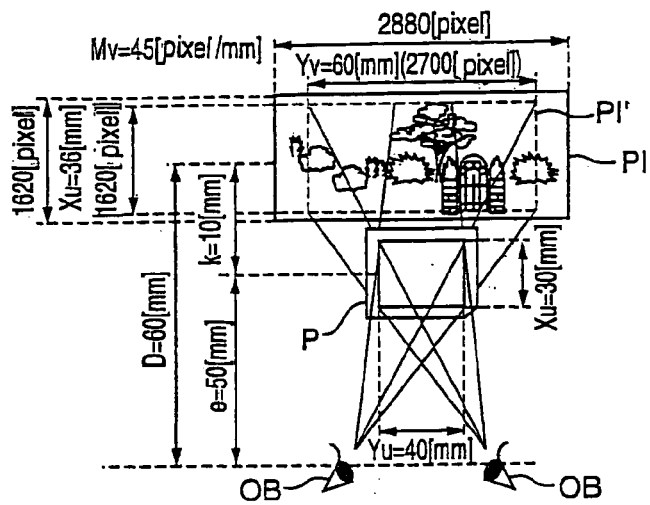
FIGS. 14A–14C are schematic diagrams illustrating the contents of processing to be executed by the picture image processing section when determining a prescribed distance from the viewing point at which a reproduced image of the panoramic picture image is to be positioned, in which FIG. 14A indicates a first method thereof which is based on a spatial resolution set up for a reproduced image of the panoramic image to be formulated, FIG. 14B indicates a second method thereof which, noting the number of pixels in the panoramic image, is based on enabling for the whole portion of the reproduced image of the panoramic image to be observed through the printed material P of a holographic stereogram, and FIG. 14C indicates a third method thereof which, noting a viewing angle of the panoramic picture image (picture image angle), is based on that its viewing angle is set to have the same or a constant relation as to the viewing angle.

The first method is implemented by setting up a spatial resolution in the reproduced image of the panoramic picture image PI. Namely, according to the first method thereof, as shown in FIG. 14A, assuming a distance from an estimated viewing point to the hologram surface SF in the printed material P to be e mm, a reproduced image of the panoramic picture image PI is to be positioned constantly at a resolution of Mv (pixel/mm). This will be described more specifically with reference to respective values thereof.

It is supposed here that a panoramic picture image PI having the number of pixels of 2880×1620 in the horizontal and vertical directions is to be displayed by a holographic stereogram having a size of 40×30 (mm) in the horizontal and vertical directions (Yu×Xu), that the distance e (mm) from a supposed viewing point by the viewer to the hologram surface SF of the printed material P is 50 mm, and that the reproduced image of the panoramic picture image PI is to be positioned at a distance D=60 mm from the viewing point and at a picture image resolution Mv=45 pixel/mm. The projection picture image PJ obtained from the plurality of viewing point converted picture images constituting the viewing point converted picture image string PXI obtained through the mapping conversion processing of the panoramic picture image PI is assumed to be exposed and recorded at the viewing angle θ=90 degrees.

In this case, the size of the panoramic picture image PI for printing is 64×36 mm in the horizontal and the vertical lengths at the distance D=60 mm from the viewing point.

On the other hand, if the distance e from the estimated viewing point to the hologram surface SF in the printed material P is assumed to be 50 mm, an area of the picture image that can be displayed at the distance D=60 mm from the viewing point through the holographic stereogram having a size of 40×30 mm in the horizontal and the vertical directions (Yu×Xu) becomes 60×36 mm in the horizontal and the vertical direction (Yv×Xv). Namely, the area of the picture image that can be displayed through the holographic stereogram has a size, in terms of the number of pixels, of 2700×1620 pixels in the horizontal and the vertical directions.

Accordingly, the picture image processing unit 40 causes to cut off a peripheral portion of the panoramic picture image PI having pixels in the number of 2880×1620 in the horizontal and the vertical directions, and take out a panoramic picture image PI' shown in a region surrounded by broken lines in the drawings and having pixels in the number of 2700×1620 in the horizontal and the vertical directions, then using the whole portion of the region of the panoramic picture image PI' performs the mapping conversion processing so as to be able to constantly position the reproduced image of the panoramic picture image PI' at the distance D from the viewing point. In the case where the picture image processing unit 40 makes use of the first method, particularly taking into consideration of the distance at which the reproduced image is desired to be positioned constantly, advantageously it is enabled that irrespective of the sizes of the holographic stereogram nor the number of pixels in the panoramic picture image PI, the reproduced image can be positioned constantly associated with a spatial size of the panoramic picture image PI.

Figure 14B:
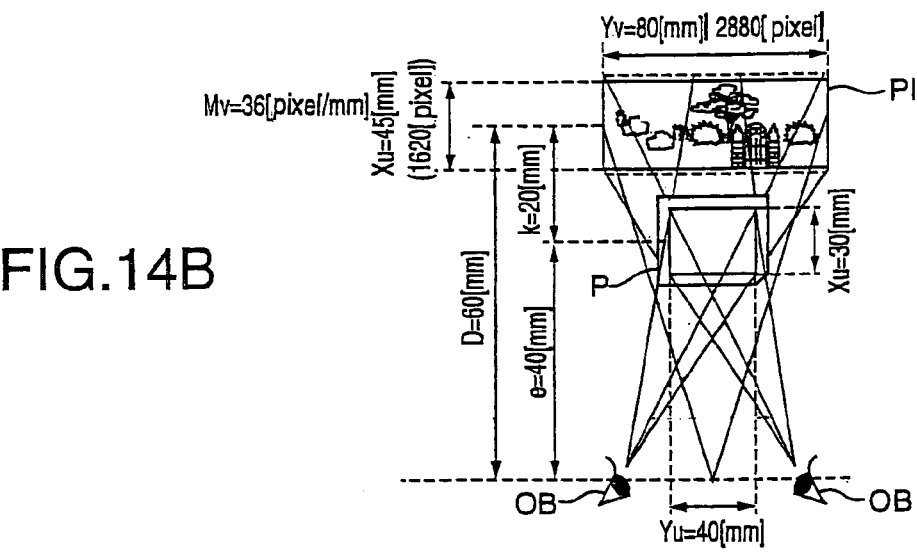

In the next, according to the second method of the present invention, by taking into consideration the number of pixels in the panoramic picture image PI, it is arranged such that the whole portion of the reproduced image of the panoramic picture image PI is enabled to be observed through the printed material P comprised of the holographic stereogram as illustrated in FIG. 14B. This will be described more specifically referring to their numerical values.

Here, it is assumed that the panoramic picture image PI having the pixels in the number of 2880×1620 in the horizontal and the vertical directions is displayed through the holographic stereogram having the size of 40×30 mm in the horizontal direction Yu and the vertical direction Xu, and that the distance e=40 mm from the estimated viewing point to the hologram surface SF in the printed material P. Further, the projection picture image PJ from the plurality of the viewing point converted picture images constituting the viewing point converted picture image string PXI with their viewing points converted by the mapping conversion processing applied to the panoramic picture image PI is assumed to be exposed and recorded at the viewing angle θ=90 degrees.

In this instance, a size of the reproduced image reproduced from the whole portion of the holographic stereogram in terms of a horizontal length (parallax direction) Yv mm and a vertical length (non-parallax direction) Xv mm is given respectively by the following equations (11) and (12), $$Yv = Yu + Yt = Yu + (Yr/z) \times k = 40 + 2 \times k \quad (11)$$

$$Xv = (30/40) \times (40 + k) \quad (12)$$

Under these conditions, in order to ensure that the whole portion of a reproduced image of the panoramic picture image PI can be observed through the printed material P comprising the holographic stereogram, namely, in order to ensure that the size of the panoramic picture image PI having the number of pixels 2880×1620 in the horizontal and the vertical directions and the size of the reproduced image reproduced from the whole portion of the holographic stereogram expressed by Yv×Xv mm in the horizontal and the vertical directions become identical, an appropriate value of the virtual distance k mm from the hologram surface SF to the reproduced image is obtained to be k=20 mm.

Thereby, the size of the reproduced image reproduced from the whole portion of the holographic stereogram becomes 80 mm×45 mm (the horizontal length Yv×the vertical length Xv), and the resolution Mv (pixel/mm) when the panoramic picture image PI having the size of 2880× 1620 (horizontal length×vertical length) is displayed becomes Mv=36 (pixel/mm).

Accordingly, the picture image processing unit 40, by performing the mapping conversion processing upon the panoramic picture image PI having pixels in the number of 2880×1620 (horizontal length×vertical length) using the virtual distance k=20 mm from the hologram surface to its reproduced image, and the resolution Mv=36 pixel/mm, is enabled to constantly position the reproduced image of the panoramic picture image PI at the distance D=e+k=40+ 20=60 mm from the viewing point. In the case the second method of the present invention is used, the picture image processing unit 40 is enabled to correlate between the position at which the reproduced image is to be positioned constantly and the spatial resolution thereof in accordance with the number of pixels in the panoramic picture image PI and an aspect ratio thereof.

Figure 14C:
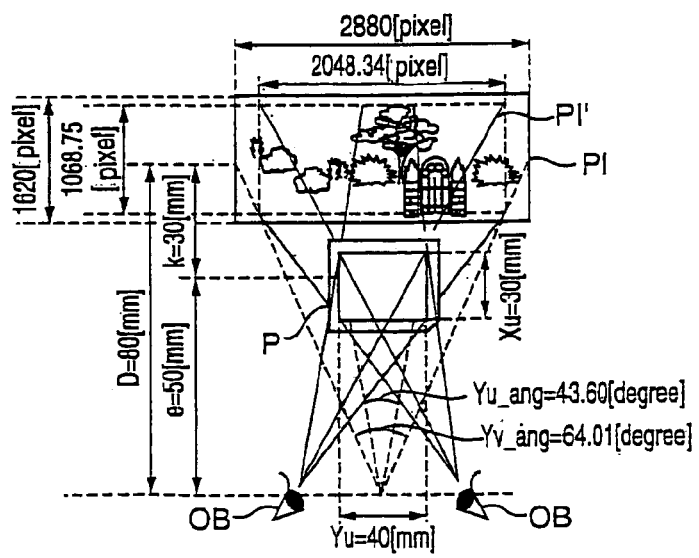

In the next, according to the third method of the present invention, by taking into consideration a viewing angle (picture angle) of the panoramic picture image PI, the same viewing angle or such one having a predetermined relation therewith is set up as shown in FIG. 14C. This will be described more specifically referring to their values.

Suppose that the panoramic picture image PI described above having the number of pixels as many as 2880×1620 in the horizontal and the vertical directions, and with viewing angles of 90 degrees in the horizontal direction and of 50.625 degrees in the vertical direction, is to be displayed through the holographic stereogram having the size of 40×30 (mm) in terms of the horizontal length Yu×the vertical length Xu, and that the distance e from the estimated viewing point to the hologram surface SF in the printed material P is e=50 mm. Here, when the holographic stereogram was observed from a viewing point which is at the center and in front thereof, its viewing angles Yu_ang (degrees) in the horizontal direction (parallax direction) and Xu_ang (degrees) in the vertical direction (non-parallax direction) will be obtained from the following equations (13) and (14), respectively, $$Yu\_ang = 2 \times \tan^{-1}(Yu/(2 \times e)) \quad (13)$$

$$Xu\_ang = 2 \times \tan^{-1}(Xu/(2 \times e)) \quad (14)$$

Here, it is obtained such that Yu_ang=43.60 degrees and Xu_ang=33.40 degrees.

If the projection picture image PJ from the plurality of the viewing point converted picture images constituting the viewing point converted picture image PXI obtained by the mapping conversion processing of the panoramic picture image PI is assumed to have been exposed and recorded at a viewing angle θ=90 degrees, the size of a reproduced image reproduced from the whole portion of its holographic stereogram, that is, in terms of its lengths Yv mm in the horizontal direction and Xv mm in the vertical direction, they are given by the following equations (15) and (16), $$Yv = Yu + Yt = Yu + (Yr/z) \times k = 40 + 2 \times k \quad (15)$$

$$\begin{aligned} Xv &= Xt \\ &= (Xr/e) \times D \\ &= (Xr/e) \times (e+k) \\ &= (30/50) \times (50+k) \end{aligned} \quad (16)$$

In this instance, viewing angle Yv_ang (deg.) in the horizontal direction (parallax direction) and viewing angle Xv_ang (deg.) in the vertical direction (non-parallax direction) of the reproduced image reproduced from the whole portion of the holographic stereogram are obtained from the following equations (17) and (18), respectively, $$Yv\_ang = 2 \times \tan^{-1}(Yv/(2 \times (50+k))) \quad (17)$$

$$Xv\_ang = 2 \times \tan^{-1}(Xv/(2 \times (50+k))) \quad (18)$$

Here, using the above equations (17) and (18), its viewing angle Xv_ang (deg.) in the vertical direction (non-parallax direction) is obtained as follow. $Xv\_ang = 2 \times \tan^{-1}((30/50)/2) = 33.40$ degrees.

Under these conditions, if the reproduced image of the panoramic picture image PI is to be positioned constantly at a distance D=80 mm from the viewing point, because that the virtual distance k from the hologram surface SF to the reproduced image becomes k=30 mm, its viewing angle in the horizontal direction (parallax direction) Yv_ang (deg.) is given from the above equation (17) that Yv_ang=64.01 degrees.

Thereby, when the distance e from the viewing point to the hologram surface SF in the printed material P is set e=50 mm, an area of a picture image that can be displayed at the distance D=80 mm from the viewing point through a holographic stereogram having a size of 40×30 (mm) in its horizontal length Yu and vertical length Xu is given in terms of pixels in the horizontal and the vertical directions to be (64.01×2880/90)×(33.40×1620/50.625)=(2048.34× 1068.75) pixels.

Accordingly, it is possible for the picture image processing unit 40 to cut out the panoramic picture image PI' having the number of pixels as many as 2048.34×1068.75 in the horizontal and the vertical directions out of the panoramic picture image PI having the number of pixels as many as 2880×1620 in the horizontal and the vertical directions by removing its circumferential portion as indicated by a region surrounded by broken lines in the drawing, to use the whole area of the cut-out panoramic picture image PI' in the mapping conversion processing, and to display the panoramic picture image PI' at the same picture angle as the specified viewing angle of the panoramic picture image PI. In this instance, when the holographic stereogram was observed from the viewing point in front and at the center thereof, the picture angle (viewing angle) Yu_ang (deg.) in the horizontal direction (parallax direction) thereof is Yu_ang=43.60 degrees, however, the picture angle Yv_ang in the horizontal direction (parallax direction) of a reproduced image reproduced from the whole portion of the holographic stereogram is found to have increased to be Yv_ang=64.01 degrees. In the case where the third method according to the present invention is used, the picture image processing unit 40 can correlate the position at which the reproduced image is to be positioned constantly and the spatial resolution at this position in accordance with the number of pixels in the panoramic picture image PI and its picture angle.

Here, the third method of the present invention has been described by way of example in which the panoramic picture image PI' was cut out so as to provide the same picture angle as the viewing angle of the panoramic picture image PI given, and the whole area of the cut-out panoramic picture image PI' was used in the mapping conversion processing, however, it is not limited thereto, and it may be arranged such that instead of providing the same viewing angle described above, a constant relationship such as a proportional relation or the like may be set up therebetween.

For example, as the panoramic picture image PI' to be cut out by removing its circumferential portion from the picture image PI having 2880×1620 pixels in the horizontal and the vertical directions, the picture image processing unit 40 can cut out such a panoramic picture image PI' having the number of pixels which was obtained by multiplying both pixels in the horizontal and the vertical directions by a predetermined times, for example, 1.25 times, that is, to cut out a panoramic picture image PI' having pixels in the horizontal and the vertical directions of (1.25×64.01×2880/ 90)×(1.25×33.40×1620/50.625)=(256 0.43×1335.94) pixels, then execute the mapping conversion processing of the whole area of the cut out panoramic picture image PI' so as to be able to display a panoramic picture image implementing both advantages of the panoramic picture image effect of a type of reducing the picture angle and another type due to that its holographic stereogram is a parallax picture image printed material.

As described hereinabove, the picture image processing unit 40 can decide the predetermined distance D from the viewing point at which the reproduced image of the panoramic picture image PI is to be positioned constantly by using either one of the following methods based on specifying;
(1) a spatial image resolution in the reproduced image of the panoramic picture image PI,
(2) parameters so as that the reproduced image of the whole portion of the panoramic picture image PI could be observed in accordance with the number of pixels in the panoramic picture image PI, and
(3) parameters so that the same viewing angle (picture angle) as that of the panoramic picture image PI or a constant relationship therewith is secured.

In the holographic stereogram thus produced, the viewing point positional information is corrected as to the parallax in the horizontal direction by the mapping conversion processing while as to the vertical direction, the information of the panoramic picture image PI is stored as it is. Thereby, the printed material production apparatus 1 of the present embodiment can produce the printed material P that minimizes visual and positional contradictions when observing the panoramic picture image PI through the printed material P, and enables to display a high fidelity and a high quality picture image.

Further, according to the printed material P of the present embodiment, because its panoramic picture image PI may stay in the same position not in the vicinity of the hologram surface SF but at the predetermined distance deeper than the hologram surface SF from the viewer, the stripes of the element hologram picture images recorded in the slit-wise form become indiscernible. That is, in such a holographic stereogram which is produced to allow its holographic stereogram picture image to be positioned constantly in the vicinity of the hologram surface SF, normally, the number of element hologram picture images recorded indicates a degree of its resolution. Accordingly, if the number of the element hologram picture images in the holographic stereogram is small, the stripes thereof appear easily discernible by the viewer, thereby reproducing a holographic stereogram image having a coarse resolution. In the printed material P, however, because the panoramic picture image PI which is a holographic stereogram picture image is not positioned constantly in the vicinity of the hologram surface SF, the number of the element holograms does not have a direct relation with its resolution, thereby ensuring for the stripes of the element hologram picture images to become indiscernible by the viewer. The effect and advantage of the present invention is not limited to the case of recording the panoramic picture image PI, but may be implemented in any case of recording any picture images.

As described hereinabove, the printed material production apparatus 1 embodying the present invention may produce the printed material P, which enables the whole picture image information of the panoramic picture image PI to be viewed at high quality through the display surface SF thereof which is physically smaller than the size of the panoramic picture image PI, and which is excellent in portability, despite of being printed material. The printed material production apparatus comprising: the picture image conversion section 30 for converting the plurality of picture images into the panoramic picture image PI; the picture image processing unit 40 for performing the mapping conversion processing to generate the viewing point converted picture images to effectuate such that the panoramic picture image PI may stay in the same position at the predetermined distance; and the printing section 60 for printing the holographic stereogram. Thereby, the viewer can view a large-sized still picture image like a panoramic picture image through the printed material P without the need of acquisition of any dedicated or specific system capable of operating specific viewer software, thereby enabling to provide sophisticated entertainments and excellent utilities.

Figure 15A:
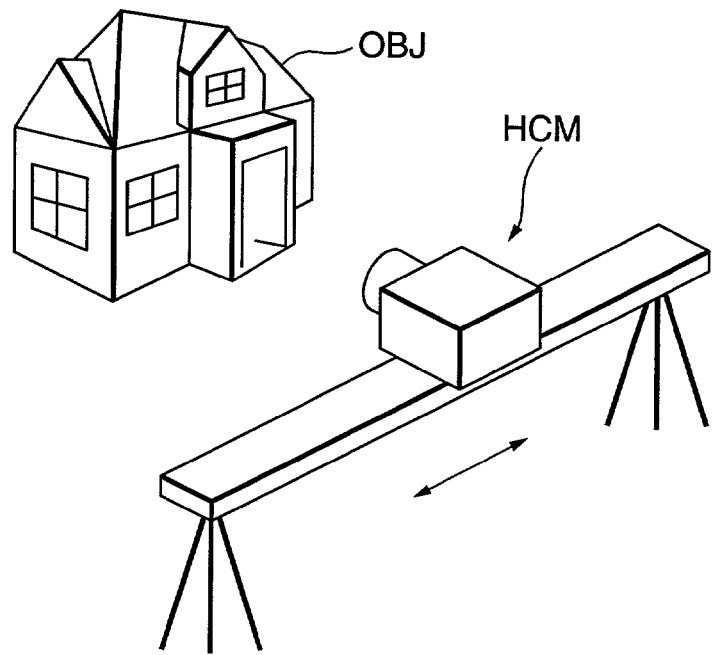
Figure 15B:
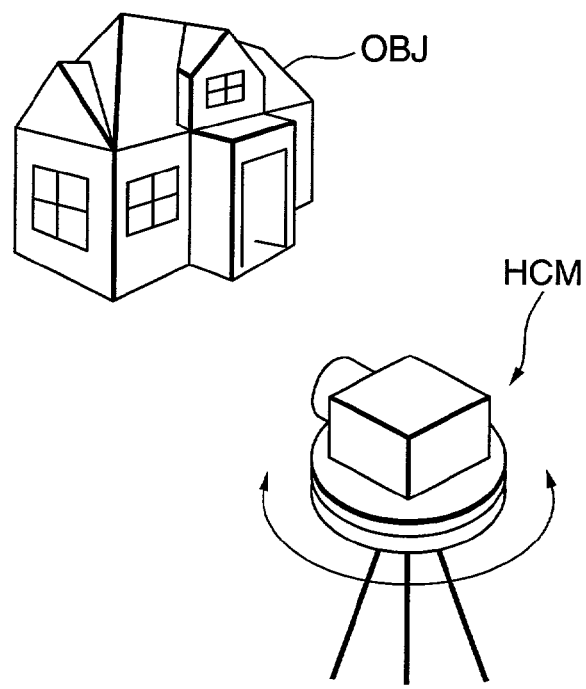
Figure 16:
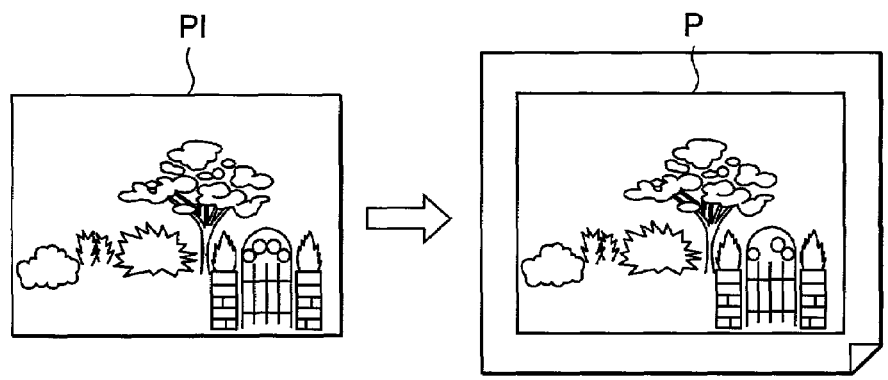
FIG. 16 is a diagram showing a relationship between a panoramic picture image and a conventional printed material or photograph thereof, both having a corresponding size.
Figure 17:
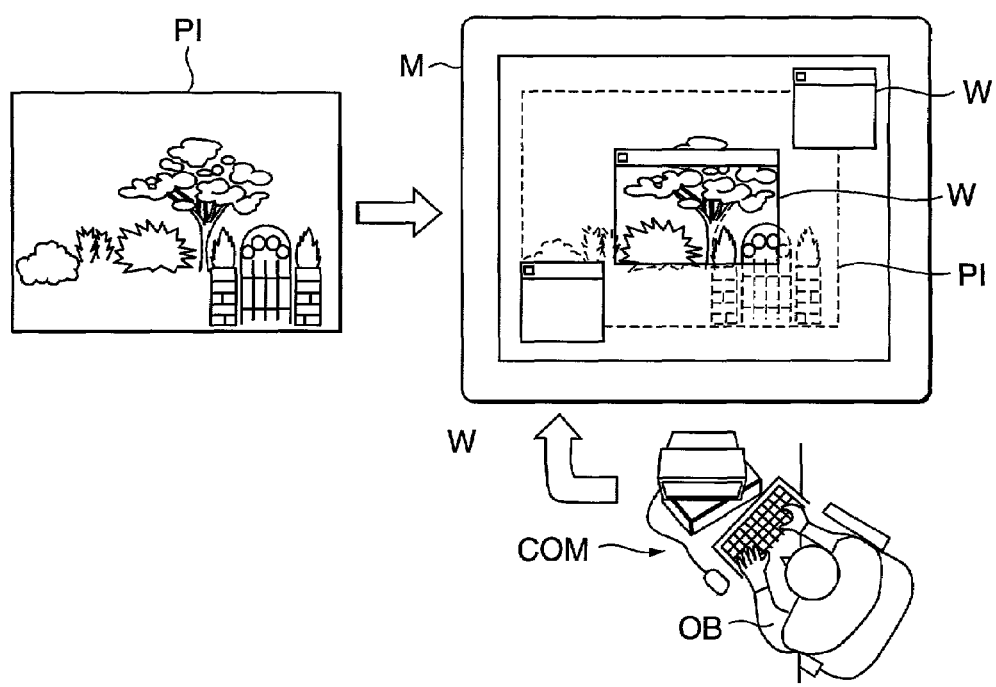
FIG. 17 is a diagram showing a conventional relationship between a panoramic picture image and viewer software thereof.

Further, advantageously, the printed material production apparatus 1 of the present embodiment needs not to have any specific camera dedicated for obtaining the above-mentioned picture image string I, and may simply input any picture image string I taken by any conventional digital still camera, video camera recorder or the like. Normally, when imaging continuous picture images or panning picture images, taking into consideration of various restrictive factors to influence a precision imaging such as imaging errors in the vertical motion of the camera relative to the motion of eyes, errors in a distance of motion due to unsteady speed of the camera relative to that of the eyes, instable motion (jittering) of a hand-held camera and the like, a dedicated camera such as a horizontal camera (HCM) moving in the horizontal direction (parallax direction) relative to the object OBJ as shown in FIG. 15A or a rotary camera RCM rotating horizontally at a fixed position relative to the object OBJ as shown in FIG. 15B had to be used. On the other hand, by use of the printed material production apparatus 1 according to the present invention, advantageously, the viewer needs not to take into consideration these complicated restrictive factors, and may simply image the picture image string I using the conventional digital still camera 100, video camera recorder or the like.

Still further, advantageously according to the printed material production apparatus 1 of the present embodiment, when executing the mapping conversion processing by the picture image processing unit 40, the viewing point conversion picture images can be generated using the information indicating its projection method for the panoramic picture image PI, thereby enabling to produce the printed material P capable of rendering a high fidelity picture image.

The present invention is not limited to the scope of the exemplary embodiments described hereinabove. For example, although the printed material production apparatus 1 embodying the present invention has been described by way of example of the system which produces the printed material P comprising the holographic stereogram having parallax information only in the horizontal direction by exposing and recording the plurality of hologram elements in the slit-like form on one hologram recording medium 110, however, the present invention is not limited thereto, and may also be applied to a provision of a system which produces printed material P comprising a holographic stereogram having parallax information both in the horizontal and the vertical directions, which will be realized by executing the viewing point conversion of the panoramic picture image PI not only in the horizontal direction but also in the vertical direction, and exposing/recording a plurality of hologram elements in the form of dots on the hologram recording medium 110.

Still further, in the above description of the exemplary embodiment of the printed material production apparatus 1 of the present invention, it has been described by way of example for producing the printed material P as a holographic stereogram, however, the present invention is not limited thereto, and it may be applied for producing the printed material P as a lenticular film or a hologram, which may be used for displaying a panoramic picture image in accordance with the methods described above for constantly positioning the panoramic picture image at the predetermined position.

Furthermore, in the above description of the embodiment of the present invention, it has been described mainly by way of example for producing the printed material Pin which the panoramic picture image PI is recorded to be positioned constantly at the predetermined location deeper than the hologram surface SF, however, the present invention is not limited thereto, and it may be applied easily for producing printed material P in which its panoramic picture image PI is recorded to be positioned constantly at a predetermined location in front of the hologram surface SF. Also in this instance, because that in its produced printed material P, the panoramic picture image PI is not positioned constantly in the vicinity of the hologram surface SF, needless to mention, the stripes of the element hologram picture images having been recorded do not appear discernible when viewed.

The printed material production apparatus embodying the present invention comprises: the picture image conversion apparatus for generating the panoramic picture image in accordance with the plurality of picture images; the viewing point conversion apparatus for generating the plurality of viewing point converted picture images so as to enable to constantly position the panoramic picture image at the predetermined distance from the viewing point; and the printing section for producing the printed material P in accordance with the plurality of viewing point converted picture images, whereby there is provided the printed material featuring an excellent portability and a unique function, that is, although its being printed material, to ensure for the whole picture image information of the panoramic picture image to be observed at high quality through the display surface of the printed material the physical size of which is substantially smaller than that of the panoramic picture image, thereby providing sophisticated entertainments and enhanced utilities to the viewer.

Further, a method of producing printed material according to the embodiment of the present invention comprises the steps of: generating a panoramic picture image in accordance with a plurality of picture images; generating a plurality of viewing point converted picture images in order to constantly position the panoramic picture image at a predetermined distance from the viewing point; and producing printed material in accordance with the plurality of viewing point converted picture images, whereby providing the printed material which, although its being printed material, ensures the whole picture image information of the panoramic picture image to be observed at high quality through the display surface thereof the physical size of which is substantially smaller than that of the panoramic picture image, and which is excellent in portability, thereby providing an enhanced and sophisticated entertainment, and excellent usefulness.

Another exemplary embodiment of the present invention will be described in the following section. Components and parts implementing the same functions as in the aforementioned exemplary embodiment of the present invention are given with the same numeric symbols and omitted of its further description.

A printed material production apparatus according to the present embodiment controls various parameters of time and/or spatial information necessary for imaging and/or generating picture image data to produce a panoramic picture image as a background picture image in a recorded picture image which is to be reproduced as a three-dimensional picture image in accordance with a picture image string generated by imaging an object with an imaging apparatus or by computer graphics (CG). Such a control of the various parameters is performed by centralizing and storing these parameters in a storage server and/or recording the same in a recording medium. Further, the printed material production apparatus generates a plurality of viewing point converted picture images using the time-spatial parameters in order that a reproduced image of the panoramic picture image may stay in the same position at a predetermined distance from the viewing point of the viewer.

Below, the printed material production apparatus according to the present embodiment for producing the above-mentioned printed material P will be described. In the following description, the printed material production apparatus will be described by way of example of producing a holographic stereogram as printed material P having exposed and recorded the holographic stereogram picture image.

Figure 18:
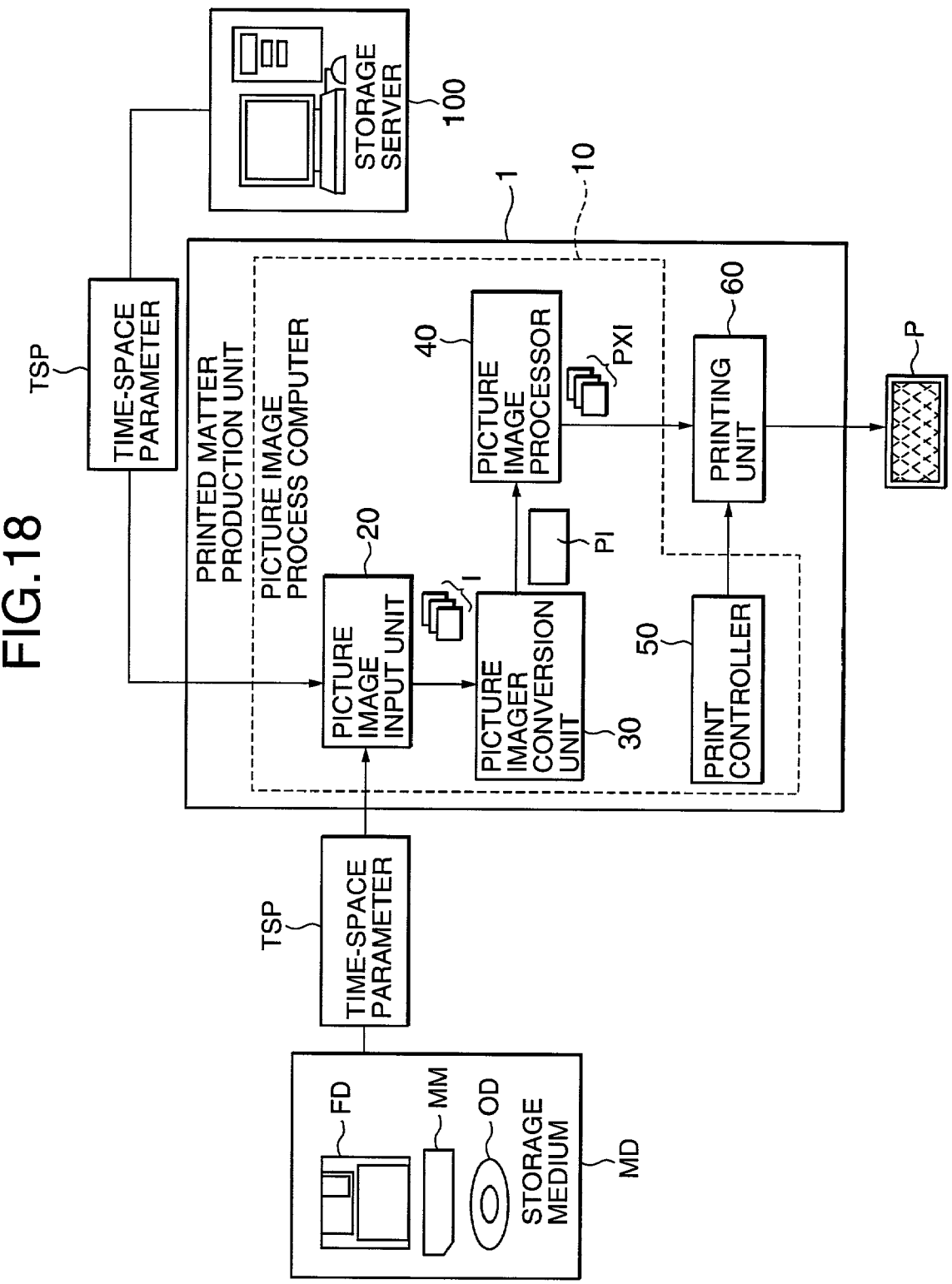
FIG. 18 is a schematic block diagram indicating a configuration of the printed material production section of the present invention.

With reference to FIG. 18, the printed material production apparatus according to the present embodiment produces the printed material P by means of a printed material production apparatus 1 using a time-spatial parameter TSP stored in a storage server 100 or a time-spatial parameter TSP recorded in a recording medium MD.

The printed material production apparatus 1 is provided with a picture image processing computer 10 for executing a picture image processing, and a printing section 60 for producing printed material P in accordance with a viewing point converted picture image string PXI comprising a plurality of viewing point converted picture images generated by the picture image processing computer 10.

The picture image processing computer 10 comprises: a picture image generator 20 as a picture image generation means for generating a picture image string I comprising a plurality of picture images; a picture image converter 30 as a picture image conversion means for converting the picture image string I comprising the plurality of picture images generated by the picture image generator 20 into a panoramic picture image; a picture image processor 40 as a viewing point conversion means for generating a viewing point converted picture image string PXI comprising a plurality of viewing point converted picture images in accordance with the panoramic picture image PI generated by the picture image converter 30; and a print controller 50 for controlling the printing section 60.

The picture image generator 20 generates a picture image string I comprising at least two or more picture images taken continuously, for example, with a digital still camera, or panning images taken with a video camera recorder. Also, the picture image generator 20 may generate such continuous picture images or panning picture images through a virtual imaging apparatus implemented in CG. In this case, the picture image generator 20 generates picture images from imaging of an object or by CG described above after reading out time-spatial parameters TSP necessary for the imaging under the control of a controller (not shown) from various time-spatial parameters stored in a storage server 100 which is connected via an interface such as USB (Universal Serial Bus (Trade Name)), IEEE Std. 1394-1995 IEEE Standard for a High Performance serial Bus Standards approved by the IEEE (The Institute of Electrical and Electronics Engineers, Inc, USA), SCSI (Small Computer System Interface), RS-232C, or via a network interface including Ethernet (Trade Name), a public telephone network or the like.

Here, the time-spatial parameter TSP includes information indicating various imaging conditions such as an imaging distance of an object imaged or generated, a resolution at a focal surface and/or a viewing angle (picture angle) such as a focal distance, a type and name of camera used in imaging, an imaging hour of the day, a translational distance of the imaging apparatus, and/or an imaging pitch.

The picture image generator 20, under these conditions specified above by the time-spatial parameter TSP, and under the control of the controller (not indicated), executes the imaging or picture image generation while moving its imaging point, and generates the picture image string I comprising the plurality of picture images.

Further, the picture image generator 20 is also capable of executing its imaging of the object or picture image generation by CG under the control of the controller (not shown) after reading out the time-spatial parameter TSP necessary for its imaging or picture image generation, and in conformance with the time-spatial parameter read out from among various time-spatial parameters recorded in various types of recording media available as a magnetic recording medium FD including a flexible disc and a hard disc, a semiconductor recording medium MM including a Memory Stick (Trade Name), Compact Flash (Trade Name), or Smart Media (Trade Name), an optical recording medium such as CD-ROM (Compact Disc-Read Only Memory), CD-R (Compact Disc-Recordable) or DVD (Digital Versatile Disc), a magneto-optical medium OD such as MO (Magneto-optical), then installing such recording medium MD having for recorded such various time-spatial parameters.

The picture image generator 20 records the time-spatial parameter TSP used in the imaging of the object or picture image generation by CG in association with each of the plurality of picture images constituting the picture image string I in conformance with a recording format such as the picture image file format standards Exif (Exif Version 2.1), the digital still camera picture image file format standards (Exif Version 2.1), Japan Electronics Industry Promotion Association, 1998. The time-spatial parameter TSP is used by the picture image processing unit 40 as its time-spatial parameter which is required when producing the printed material P for indicating at which viewing angle and at which exposure pitch it should be exposed and recorded.

The picture image string I comprising the plurality of picture images thus generated by the picture image generator 20 is supplied to the picture image conversion section 30.

The picture image conversion section 30 converts the plurality of picture images constituting the picture image string I into a panoramic picture image PI by joining them together. In this case, the picture image conversion section 30 may generate the panoramic picture image PI by using an arbitrary method. For example, the picture image conversion section 30, after obtaining a spatial correlation between respective picture images constituting the inputted picture image string I, obtains a geometrical and positional relationship existing therebetween such as translation, rotation, enlargement, reduction or the like, then on the basis of the geometrical and positional relationship obtained above and after execution of a spatial processing such as the translation, rotation, enlargement, reduction or the like, executes the overlaying and joining processing therebetween. Further, when overlaying and joining respective picture images, an appropriate area to be overlapped between respective picture images is determined and/or a degree of overlaying therebetween is adjusted in accordance with the spatial correlation between these respective picture images, thereby enabling the picture image conversion section 30 to generate the panoramic picture image PI in which a joint seam is substantially eliminated or hardly discernible.

If the above-mentioned viewing angle information is recorded as the time-spatial parameter TSP in each of the plurality of picture images constituting the picture image string I, the printed material production apparatus 1 is enabled to obtain viewing angle information of the panoramic picture image PI synthesized above in accordance with the viewing angle information recorded in each of the plurality of picture images and the geometrical and positional relationship between these picture images. Further, if the above-mentioned information indicating the types and names of machines used is recorded instead of the viewing angle information in each of the plurality of picture images constituting the picture image string I, the printed material production apparatus 1 can obtain a viewing angle of each picture image on the basis of the information indicating the types of machines used. These pieces of viewing angle information is used in the mapping conversion processing in the picture image processor 40 as will be described later.

Further, picture image conversion section 30 may change a spatial form of the panoramic picture image PI into an arbitrary form such as planar, cylindrical or spherical forms when generating the panoramic picture image PI. For example, just like viewing through a fish-eye lens that is used to display a spherical panoramic picture image, which is to be projected on a spherical surface, onto a planar screen, the picture image conversion section 30 calculates a spatial form of the panoramic picture image PI likewise the panoramic picture image viewed through the fish-eye lens, and generates it accordingly. The picture image conversion section 30 may affix to the generated panoramic picture image PI a specified projection method information indicating into which spatial form the panoramic picture image PI is to be projected. The projection method information is used in the mapping conversion processing in the picture image processing unit 40.

The panoramic picture image PI generated above by the picture image conversion section 30 is supplied to the picture image processing unit 40.

The picture image processing unit 40 executes the mapping conversion processing (viewing point conversion processing) in order to effectuate that a reproduced image of the panoramic picture image PI finally to be reproduced as a holographic stereogram picture image may stay in the same position at a predetermined location. Here, it should be understood that the mapping conversion processing is a processing to generate a plurality of viewing point converted picture images by reconstructing the panoramic picture image PI so as that a reproduced image of the panoramic picture image PI reproduced as a holographic stereogram picture image from the printed material P thus produced may stay in the same position at a predetermined distance from the viewing point. In the mapping conversion processing, one of the parameters to de determined in advance is a distance information indicating at which distance the reproduced image of the panoramic picture image PI is to be positioned constantly in the printed material P finally produced. If the viewing angle information of the panoramic picture image PI is known, the picture image processing unit 40 is enabled to calculate the distance at which the reproduced image thereof should be positioned constantly in accordance with the viewing angle information. Further, if its projection method information of the panoramic picture image PI is known, the picture image processing unit 40 is enabled to generate a viewing point converted picture image string PXI comprising a plurality of viewing point converted picture images in accordance with the projection method information. Each of the plurality of viewing point converted picture images constituting the viewing point converted picture image string PXI generated by the picture image processing unit 40 is supplied to the printing section 60 as an element hologram picture image (hologram picture image element) which is a display element unit sequentially to be displayed on a transmission type liquid crystal display for exposure and recording as a holographic stereogram. The mapping conversion processing will be described more in detail below.

The printing controller 50 jointly controls respective components and parts of the printed material production apparatus 1 and, in particular, controls the operation of the printing section 60.

The printing section 60 under the control of the printing controller 50 produces printed material P in accordance with the viewing point converted picture image string PXI comprising the plurality of viewing point converted picture images each of them being an element hologram image (hologram picture image element). Specifically, the printing section 60 which is provided with a predetermined optical system for producing a holographic stereogram produces the holographic stereogram by exposing and recording the plurality of viewing point converted picture images constituting the viewing point converted picture image string PXI as its element hologram picture images on a hologram recording medium, and executes a predetermined fixing processing to the holographic stereogram to complete as the printed material P.

Here, it should be noted that the printing section 60 used in this instant embodiment of the present invention has the same constitution and the same function as those of the printing section 60 used in the preceding embodiment described above by referring to FIGS. 4 to 7.

The mapping conversion processing (viewing point conversion processing) executed in the picture image processing unit 40 for generating the viewing point converted picture image string PXI to be displayed as the element hologram picture image on the transmission type liquid crystal display 80 in the printing section 60 will be described in the following.

In the printed material production apparatus 1, the picture image processing unit 40 therein executes the mapping conversion processing of the panoramic picture image PI so as to generate the viewing point converted picture image string PXI comprising the plurality of viewing point converted picture images which are to be exposed and recorded in the printing section 60 as the element hologram picture images on the hologram recording medium 110. Referring to FIG. 8, through execution of the mapping conversion processing, the printed material production apparatus 1 produces the printed material P whereby a reproduced image of the panoramic picture image PI is reproduced as a holographic stereogram picture image at a predetermined distance (f+e) remote from the viewing point of the viewer OB, that is, at the predetermined distance deeper by a predetermined length f than a display surface or a hologram surface SF of the printed material P which is located apart from the viewing point by a predetermined length e. The fundamental principle of the mapping conversion processing has been disclosed in JP-A Laid-Open No. H11-109839 filed by the instant applicant, in which two-dimensional picture image information including character string and picture image information is synthesized with a holographic stereogram picture image, exposed and recorded in the hologram recording medium at an arbitrary depth thereof. This fundamental principle is referred to in the above and the same as the above description set forth with reference to FIGS. 9–12.

Figure 19:
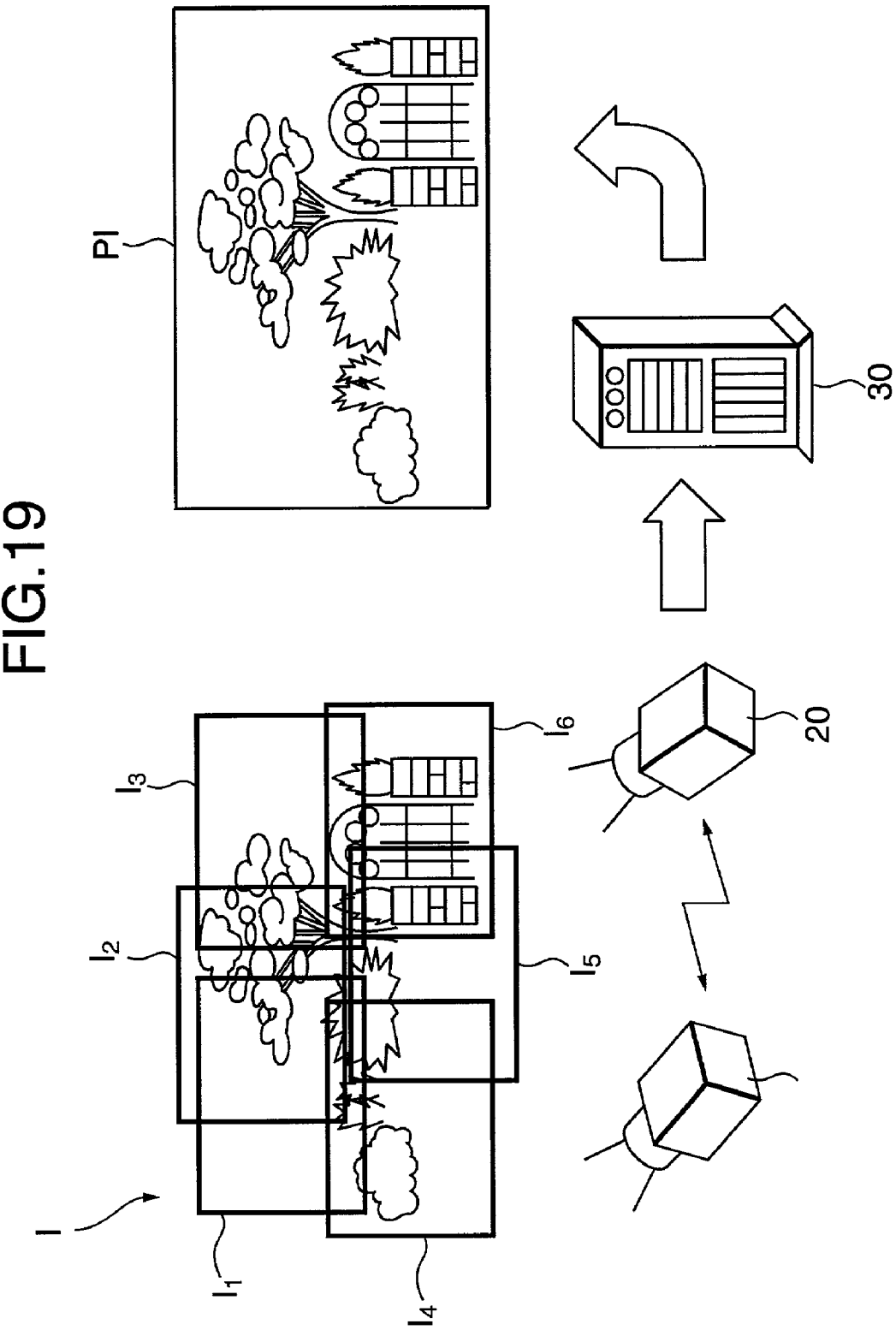
FIG. 19 is an illustration indicating an exemplary manner of generating a panoramic picture image according to the present invention.

Now, in the printed material production apparatus 1 described above, while the picture image conversion section 30 generates the panoramic picture image PI, the picture image processing unit 40 executes the mapping conversion processing thereof by applying the above-mentioned fundamental principle in order to effectuate that the reproduced image of the panoramic picture image PI reproduced as the holographic stereogram picture image may stay in the same position at the predetermined distance from the viewing point. At this instant, the picture image processing unit 40 decides the predetermined distance D from the viewing point at which the reproduced image of the panoramic picture image PI is to be positioned constantly using either of the following three methods. With reference to FIG. 19, an exemplary mapping conversion processing will be described using an example as applied to a panoramic picture image PI generated from a picture image string comprising six sheets of picture images $I_1$, $I_2$, $I_3$, $I_4$, $I_5$ and $I_6$.

Here, it is assumed that each of the picture images $I_1$, $I_2$, $I_3$, $I_4$, $I_5$ and $I_6$ is shot (imaged) at a horizontal picture angle (viewing angle) of 40 degrees and a vertical picture angle (viewing angle) of 30 degrees by the picture image generating apparatus 20, and that the number of pixels thereof is 1280×960 (pixels) in the horizontal and the vertical directions. In this case, if the picture image conversion section 30 is assumed to generate a panoramic picture image PI having the number of pixels of 2880×1620 (pixels) in the horizontal and the vertical directions, the panoramic picture image PI to be generated corresponds to a picture image having a horizontal picture (viewing) angle of 90 degrees and a vertical picture (viewing) angle of 50.625 degrees.

The picture image processing unit 40 determines its predetermined distance D from the viewing point at which the reproduced image of the panoramic picture image PI is to be remained at the same position in accordance with either one of the above-mentioned three methods.

Further, the printed material production apparatus 1 according to the present invention is also capable of producing printed material P as a holographic stereogram in which a different three dimensional picture image is reproduced in front of the reproduced image of the panoramic picture image PI rendered as a background picture image of the three dimensional picture image. That is, the printed material production apparatus 1 of the present embodiment is allowed to synthesize the viewing point converted picture image string PXI generated in the picture image processing unit 40 by the mapping conversion processing of the panoramic picture image PI and a parallax picture image string comprising a plurality of parallax picture images each containing parallax information, to execute the exposure and recording processing in the printing section 60 in accordance with the synthesized picture image, and to produce the printed material P in which the two dimensional panoramic picture image PI is reproduced as the background picture image of the three dimensional picture image. It is also preferable for the parallax picture image string comprising the plurality of parallax picture images to have a viewing point conversion processing using the above-mentioned time-spatial parameter TSP in the printed material production apparatus 1 such that a reproduced picture image of the three dimensional picture image may stay in the same position, for example, on the hologram surface SF. The viewing point conversion processing is described in the JP-A Laid-Open No. H11-109839 referred to in the above. When synthesizing the viewing point converted picture image string PXI and the parallax picture image string comprising the plurality of parallax picture images, the printed material production apparatus 1 is required to secure matching between the time-spatial parameters used in the mapping conversion processing of the panoramic picture image PI and the time-spatial parameters used in the viewing point conversion processing of the parallax picture image string comprising the plurality of parallax picture images.

As described hereinabove, the printed material production apparatus embodying the present invention comprises: the storage server 3 and/or the recording medium MD for jointly controlling the time-spatial parameters necessary for imaging and/or picture image generation by storing therein; the picture image generation apparatus 20 for generating a plurality of picture images in accordance with the time-spatial parameter TSP read out from the storage server 100 or the recording medium MD; the picture image conversion section 30 for converting the plurality of picture images into a panoramic picture image PI; the picture image processing unit 40 for generating the viewing point converted picture images by the mapping conversion processing in accordance with the time-spatial parameter TSP in order to effectuate that the panoramic picture image PI may stay in the same position at the predetermined distance; the printing section 60 for printing printed material P as a holographic stereogram thereby automatically setting up the time-spatial parameter so as to be able to generate the viewing point converted picture image string PXI easily and rapidly, whereby enabling to produce the printed material P, which although is provided as printed material has an excellent portability, allows for the whole information of the panoramic picture image PI to be observed at a high quality through the display surface SF the physical size of which is substantially smaller than that of the panoramic picture image PI itself. Accordingly, according to the printed material production apparatus of the present embodiment, the panoramic picture image PI described above may be synthesized with another picture image which is a three-dimensional picture image and used as the background picture image thereof to be exposed and recorded as printed material P, thereby providing a highly sophisticated form of entertainment and usefulness to the viewer.

Further, when executing the mapping conversion processing in the picture image processing unit 40 according to the printed material production apparatus of the present embodiment, if its viewing point converted picture images are generated using the projection method information for the panoramic picture image PI, a high fidelity printed material P can be produced.

The present invention is not limited to the exemplary preferred embodiments described hereinabove. For example, although the above-mentioned embodiment of the present invention has been described by way of example of the printed material production apparatus that produces the printed material P comprising the holographic stereogram having the parallax information in the horizontal directions, realized by the exposure and recording of the plurality of hologram elements in the form of a bamboo screen on one hologram recording medium 110, the present invention may be applied also for producing printed material P comprising a holographic stereogram having parallax information both in the horizontal and the vertical directions, to be realized by execution of the viewing point conversion processing also in the vertical direction, and by exposure and recording of a plurality of hologram elements in the form of dots on one hologram recording medium 110.

Further, although the above-mentioned embodiments of the present invention have been described by way of example that the printed material production apparatus 1 produces the printed material P as the holographic stereogram, the present invention is not limited thereto. The present invention may be applied also for producing printed material P as a lenticular sheet, which is enabled to display a panoramic picture image by following either one of the above-mentioned three methods for keeping the panoramic picture image at the same position.

It is therefore to be understood that any modifications, variations and combinations will be practiced otherwise than as specifically described herein without departing from the scope of the present invention.

The background picture image generation apparatus according to the embodiment of the present invention comprises: the picture image generation apparatus for generating the plurality of picture images in accordance with the desirable time-spatial parameters read in from external; the picture image conversion apparatus for generating a panoramic picture image to be recorded as a background picture image in accordance with these plurality of picture images generated above; the viewing point conversion apparatus for generating the plurality of viewing point converted picture images in accordance with the time-spatial parameters obtained from external in order to effectuate that the panoramic picture image may stay in the same position at the predetermined distance from the viewing point, thereby enabling in consequence automatically to set up the time-spatial parameters thereby enabling to generate the viewing point converted picture image string easily and quickly, thereby contributing to the production of printed material which is excellent in portability and allows to observe the whole information of the panoramic picture image as the background image at a high quality therethrough. That is, the background picture image production apparatus embodying the present invention can contribute to the production of the printed material in which the panoramic picture image is rendered as the background image synthesized with the three dimensional picture image placed in front thereof to be exposed and recorded, thereby providing highly sophisticated form of entertainment and excellent utility to the viewer.

A method of the background picture image generation embodying the present invention comprises the steps of: generating the plurality of picture images in accordance with the desirable time-spatial parameters read in from external; generating the panoramic picture image to be recorded as the background picture image in accordance with these plurality of picture images generated; generating the plurality of viewing point converted picture images in accordance with the time-spatial parameters so that the panoramic picture image may stay in the same position at the predetermined distance from the viewing point, thereby enabling automatically to set up the time-spatial parameters; and generating the viewing point converted picture image string easily and quickly, whereby contributing to the production of the printed material which is excellent in portability and allows the whole information of the panoramic picture image to be observed as the background picture image at a high quality. That is, the method of producing the background picture image according to the present invention can contribute to the production of the printed material in which the panoramic picture image as the background picture image and the three dimensional another picture image are synthesized, exposed and recorded, thereby capable of providing the highly sophisticated form of entertainment and excellent utility to the viewer.

What is claimed is:

1. A printed material production apparatus for producing printed material in accordance with parallax picture images, the apparatus comprising:
   a picture image input section for inputting a plurality of picture images;
   a picture image conversion section for converting said plurality of picture images inputted to generate a panoramic picture image;
   a viewing point conversion section for generating a plurality of viewing point converted picture images in accordance with the panoramic picture image generated; and
   a printing section for producing printed material in accordance with the plurality of viewing point converted picture images generated, wherein
   said viewing point conversion section generates the plurality of viewing point converted picture images so as to maintain a position of a reproduced image of the panoramic picture image reproduced from the printed material produced by said printing section at a predetermined distance from a viewing point.

2. The printed material production apparatus according to claim 1, wherein said viewing point conversion section determines the predetermined distance upon setting up of a spatial resolution of the reproduced image.

3. The printed material production apparatus according to claim 1, wherein
   said viewing point conversion section determines the predetermined distance in accordance with the number of pixels to be specified in said panoramic picture image generated so as to ensure that the whole portion of the reproduced image of said panoramic picture image is viewed through the printed material.

4. The printed material production apparatus according to claim 1, wherein
   said viewing point conversion section determines the predetermined distance in accordance with viewing angle information recorded being affixed to each of said plurality of picture images inputted via said picture image input section, and/or viewing angle information of said panoramic picture image generated in accordance with said viewing angle information recorded.

5. The printed material production apparatus according to claim 4, wherein
   said viewing point conversion section determines the predetermined distance so as to provide the same viewing angle as that of the panoramic picture image or a constant relationship therewith.

6. The printed material production apparatus according to claim 1, wherein
   said viewing point conversion section generates the plurality of viewing point converted picture images using projection method information indicating a spatial form with which the panoramic picture image is projected.

7. The printed material production apparatus according to claim 1, wherein
   said viewing point conversion section generates the plurality of viewing point converted picture images so as to maintain a position of a reproduced image of the panoramic picture image reproduced from said printed material at a predetermined distance apart from a display surface of the printed material, the predetermined distance being in front of or backward of said display surface.

8. The printed material production apparatus according to claim 1, wherein
   the printed material comprises one of a lenticular sheet, a hologram and a holographic stereogram.

9. A method of producing printed material in accordance with parallax picture images, the method comprising:
   an input step of inputting a plurality of picture images;
   a picture image conversion step of converting the plurality of picture images inputted into a panoramic picture image;
   a viewing point conversion step of generating a plurality of viewing point converted picture images in accordance with the panoramic picture image; and
   a printing step of producing printed material in accordance with the plurality of viewing point converted picture images generated, wherein said viewing point conversion step generates the plurality of viewing point converted picture images so as to maintain a position of a reproduced image of the panoramic picture image reproduced from said printed material at a predetermined distance from a viewing point.

10. The method of producing the printed material according to claim 9, wherein
    in said viewing point conversion step, the predetermined distance is determined by specifying a spatial resolution of the reproduced image of the panoramic picture image.

11. The method of producing the printed material according to claim 9, wherein
    in said viewing point conversion step, the predetermined distance is determined in accordance with the number of pixels in the panoramic picture image so that the whole portion of the reproduced image of the panoramic picture image can be viewed through the printed material.

12. The method of producing the printed material according to claim 9, wherein
    in said viewing point conversion step, the predetermined distance is determined in accordance with viewing angle information recorded as affixed to each of the plurality of picture images inputted, and/or in accordance with viewing angle information of said panoramic picture image obtained from the viewing angle information affixed to each of the said plurality of picture images.

13. The method of producing the printed material according to claim 12, wherein
    in said viewing point conversion step, the predetermined distance is determined so as to provide the same viewing angle as that of the panoramic picture image or a constant relationship therewith.

14. The method of producing the printed material according to claim 9, wherein
    in said viewing point conversion step, the plurality of viewing point converted picture images are generated using projection method information indicating a spatial form with which the panoramic picture image is projected.

15. The method of producing the printed material according to claim 9, wherein
    in said viewing point conversion step, the plurality of viewing point converted picture images are generated so as to maintain a position of a reproduced image of the panoramic picture image reproduced from said printed material at a predetermined distance relative to a display surface of the printed material, the predetermined distance being in front of the display surface or backward thereof.

16. The method of producing the printed material according to claim 9, wherein
the printed material comprises one of a lenticular sheet, a hologram and a holographic stereogram.

17. A background picture image production apparatus for producing a picture image to be recorded as a background picture image in printed material in accordance with a parallax picture image string comprising a plurality of parallax picture images containing parallax information, the apparatus comprising:
a picture image generation section for generating a plurality of picture images by imaging or virtual imaging using an imaging apparatus or a virtual imaging apparatus while moving its imaging point in accordance with a time-spatial parameter read in from an external apparatus, which is one of time and spatial information required in the imaging or the virtual imaging;
a picture image conversion section for converting the plurality of picture images generated into a panoramic picture image and recording it as the background picture image; and
a viewing point conversion section for generating a plurality of viewing point converted picture images in accordance with the panoramic picture image generated, wherein
said viewing point conversion section generates the plurality of viewing point converted picture images in accordance with the time-spatial parameter read in so as to maintain a position of a reproduced image of the panoramic picture image reproduced from the printed material produced at a predetermined distance from a viewing point.

18. The background picture image production apparatus according to claim 17, wherein
said viewing point conversion section determines the predetermined distance by setting a time-spatial resolution of the reproduced image in accordance with the time-spatial parameter.

19. The background picture image production apparatus according to claim 17, wherein
said viewing point conversion section determines the predetermined distance in accordance with the number of pixels in the panoramic picture image generated so that the whole portion of the reproduced image of said panoramic picture image can be viewed through the printed material.

20. The background picture image production apparatus according to claim 17, wherein
said viewing point conversion section determines the predetermined distance in accordance with viewing angle information used as the time-spatial parameter when generating each of the plurality of picture images by said picture image generation section, and/or in accordance with viewing angle information of the panoramic picture image obtained in accordance with the viewing angle information of the plurality of the picture images.

21. The background picture image generation section according to claim 20, wherein
said viewing point conversion section determines the predetermined distance so as to provide the same viewing angle as that of said panoramic picture image or a constant relationship therewith.

22. The background picture image generation section according to claim 17, wherein
said viewing point conversion section generates the plurality of viewing point converted picture images using projection method information indicating a spatial form with which the panoramic picture image is projected.

23. The background picture image generation section according to claim 17, further connected to a storage apparatus for storing various time-spatial parameters via an interface, wherein
said picture image generation section reads out a time-spatial parameter necessary for the imaging or the picture image generation from among said various time-spatial parameters stored in said storage apparatus.

24. The background picture image generation section according to claim 17, wherein
said picture image generation section reads out a time-spatial parameter necessary for the imaging or the picture image generation from various time-spatial parameters recorded in a recording medium installed therein.

25. The background picture image generation section according to claim 17, wherein
the time-spatial parameter comprises information indicating imaging condition of an imaging apparatus or a virtual imaging apparatus.

26. The background picture image generation section according to claim 25, wherein
the time-spatial parameter comprises at least one of an imaging distance of an object, a viewing angle information, a type/name of the imaging apparatus, an imaging time, a translational motion distance and an imaging pitch.

27. The background picture image generation section according to claim 17, wherein
said printed material comprises one of a lenticular film and a holographic stereogram.

28. A method of generating a background picture image to record in printed material produced in accordance with parallax picture images string comprising a plurality of parallax picture images containing parallax information, the method comprising:
a picture image generating step of generating a plurality of picture images by imaging or a virtual picture image generation using an imaging apparatus or a virtual imaging apparatus while moving an imaging point thereof in accordance with a time-spatial parameter which is at least one of a time and spatial information read in from an external apparatus and is necessary in the imaging or the virtual picture image generation;
a picture image conversion step of converting the plurality of picture images generated into a panoramic picture image to record as the background picture image; and
a viewing point conversion step of generating a plurality of viewing point converted picture images in accordance with the panoramic picture image generated in said picture image conversion step, wherein
in said viewing point conversion step, the plurality of viewing point converted picture images are generated in accordance with the time-spatial parameter so as to maintain a position of a reproduced image of said panoramic picture image reproduced from the printed material at a predetermined distance from a viewing point.

29. The method of generating the background picture image according to claim 28, wherein
in said viewing point conversion step, the predetermined distance is determined by presetting a spatial resolution of the reproduced image of the panoramic picture image reproduced from the printed material.

30. The method of generating the background picture image according to claim 28, wherein
in said viewing point conversion step, the predetermined distance is determined in accordance with the number of pixels in said panoramic picture image generated so that the whole portion of the reproduced image of the panoramic picture image can be viewed through the printed material.

31. The method of generating the background picture image according to claim 28, wherein
in said viewing point conversion step, the predetermined distance is determined in accordance with viewing angle information used as the time-spatial parameter when generating each of the plurality of picture images in the picture image generating step, and/or viewing angle information of the panoramic picture image obtained using the viewing angle information of the plurality of the picture images.

32. The method of generating the background picture image according to claim 31, wherein
in said viewing point converting step, the predetermined distance is determined so as to provide a viewing angle the same as that of said panoramic picture image, or a constant relationship therewith.

33. The method of generating the background picture image according to claim 28, wherein
in said viewing point converting step, the plurality of the viewing point converted picture images are generated using projection method information indicating a spatial form with which the panoramic picture image is projected.

34. The method of generating the background picture image according to claim 28, wherein
in said picture image generating step, a desirable time-spatial parameter necessary for its imaging or picture image generation is read out via the network from a set of various time-spatial parameters stored in a storage apparatus.

35. The method of generating the background picture image according to claim 28, wherein
in said picture image generating step, a time-spatial parameter necessary for its imaging or picture image generation is read out from various time-spatial parameters recorded in a recording medium installed therein.

36. The method of generating the background picture image according to claim 28, wherein
the time-spatial parameter comprises information indicating imaging conditions of the imaging apparatus or the virtual imaging apparatus.

37. The method of generating the background picture image according to claim 36, wherein
the time-spatial parameter comprises at least one of an imaging distance of an object, viewing angle information, a type/name of said imaging apparatus, imaging time, a translational distance and an imaging pitch.

38. The method of generating the background picture image according to claim 28, wherein
the printed material comprises one of a lenticular film and a holographic stereogram.

* * * * *

UNITED STATES PATENT AND TRADEMARK OFFICE
CERTIFICATE OF CORRECTION

PATENT NO. : 7,209,585 B2 Page 1 of 1
APPLICATION NO. : 10/167475
DATED : April 24, 2007
INVENTOR(S) : Koji Ashizaki et al.

It is certified that error appears in the above-identified patent and that said Letters Patent is hereby corrected as shown below:

Column 37:
Line 11, "in printed material" should read -- in a printed material --.

Column 38:
Line 42, "parallax picture images string" should read
-- a parallax picture images string --.

Signed and Sealed this

Seventh Day of August, 2007

JON W. DUDAS
*Director of the United States Patent and Trademark Office*